(12) United States Patent
Madson et al.

(10) Patent No.: US 11,666,802 B2
(45) Date of Patent: Jun. 6, 2023

(54) GOLF BALL HAVING NON-PLANAR PARTING LINE

(71) Applicant: Acushnet Company, Fairhaven, MA (US)

(72) Inventors: Michael R. Madson, Easton, MA (US); Nicholas M. Nardacci, Barrington, RI (US); David P. Hunt, Taunton, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 17/727,136

(22) Filed: Apr. 22, 2022

(65) Prior Publication Data

US 2022/0249914 A1    Aug. 11, 2022

Related U.S. Application Data

(63) Continuation of application No. 17/035,828, filed on Sep. 29, 2020, now Pat. No. 11,318,355, which is a continuation-in-part of application No. 16/787,452, filed on Feb. 11, 2020, now Pat. No. 10,786,708, which is a continuation-in-part of application No. 16/416,560, filed on May 20, 2019, now Pat. No. 10,556,153, which is a continuation-in-part of application No. 15/960,843, filed on Apr. 24, 2018, now Pat. No. 10,293,213, which is a continuation-in-part of application No. 15/592,262, filed on May 11, 2017, now Pat. No. 9,950,215, which is a continuation of application No. 14/929,500, filed on Nov. 2, 2015, now Pat. No. 9,649,536, which is a continuation-in-part of application No. 13/625,109, filed on Sep. 24, 2012, (Continued)

(51) Int. Cl.
| | |
|---|---|
| A63B 37/00 | (2006.01) |
| A63B 45/00 | (2006.01) |
| B29C 45/14 | (2006.01) |
| B29C 45/27 | (2006.01) |
| B29C 45/26 | (2006.01) |
| B29C 45/03 | (2006.01) |
| B29C 45/00 | (2006.01) |
| B29C 45/37 | (2006.01) |

(52) U.S. Cl.
CPC .......... *A63B 37/007* (2013.01); *A63B 37/002* (2013.01); *A63B 37/0006* (2013.01); *A63B 37/0007* (2013.01); *A63B 45/00* (2013.01); *B29C 45/0046* (2013.01); *B29C 45/03* (2013.01); *B29C 45/14* (2013.01); *B29C 45/14819* (2013.01); *B29C 45/26* (2013.01); *B29C 45/2708* (2013.01); *B29C 45/37* (2013.01); *B29C 45/372* (2013.01); *A63B 37/0004* (2013.01); *A63B 37/0012* (2013.01); *B29C 2045/0034* (2013.01); *B29C 2045/0079* (2013.01); *B29C 2045/2709* (2013.01); *B29K 2875/00* (2013.01); *B29K 2896/005* (2013.01)

(58) Field of Classification Search
CPC ............ A63B 37/0006; A63B 37/0007; A63B 37/007
See application file for complete search history.

(56) References Cited

U.S. PATENT DOCUMENTS

| | | |
|---|---|---|
| 4,653,758 A | 3/1987 | Solheim |
| 5,249,804 A | 10/1993 | Sanchez |

(Continued)

*Primary Examiner* — James Sanders

(57) ABSTRACT

The present invention is directed to a golf ball having a non-planar parting line on its spherical surface.

8 Claims, 27 Drawing Sheets

Related U.S. Application Data now Pat. No. 9,174,088, which is a continuation-in-part of application No. 12/755,605, filed on Apr. 7, 2010, now Pat. No. 8,414,428.

(56) References Cited

U.S. PATENT DOCUMENTS

| | | |
|---|---|---|
| 5,688,193 A | 11/1997 | Kasasima et al. |
| 5,827,135 A | 10/1998 | Shimosaka et al. |
| 5,840,351 A | 11/1998 | Inoue et al. |
| 5,874,038 A | 2/1999 | Kasashima et al. |
| 5,947,844 A | 9/1999 | Shimosaka et al. |
| 6,123,534 A | 9/2000 | Kasashima et al. |
| 6,719,647 B2 | 4/2004 | Sajima |
| 7,387,504 B2 | 6/2008 | Aoyama et al. |
| 7,422,529 B2 | 9/2008 | Aoyama et al. |
| 7,431,670 B2 | 10/2008 | Nardacci et al. |
| 9,174,088 B2 | 11/2015 | Madson |
| 9,950,215 B2 | 4/2018 | Nardacci |
| 10,556,153 B2 | 2/2020 | Madson |
| 2001/0027141 A1 | 10/2001 | Sajima |
| 2002/0037335 A1 | 3/2002 | Ogg et al. |
| 2002/0094886 A1 | 7/2002 | Sajima |

GOLF BALL HAVING NON-PLANAR PARTING LINE

CROSS-REFERENCE TO RELATED APPLICATIONS

The present application is a continuation of U.S. patent application Ser. No. 17/035,828, filed Sep. 29, 2020, which is a continuation-in-part of U.S. patent application Ser. No. 16/787,452, filed Feb. 11, 2020, now U.S. Pat. No. 10,786,708, which is a continuation-in-part of U.S. patent application Ser. No. 16/416,560, filed May 20, 2019, now U.S. Pat. No. 10,556,153, which is a continuation-in-part of U.S. patent application Ser. No. 15/960,843, filed Apr. 24, 2018, now U.S. Pat. No. 10,293,213, which is a continuation-in-part of U.S. patent application Ser. No. 15/592,262, filed May 11, 2017, now U.S. Pat. No. 9,950,215, which is a continuation of U.S. patent application Ser. No. 14/929,500, filed Nov. 2, 2015, now U.S. Pat. No. 9,649,536, which is a continuation-in-part of U.S. patent application Ser. No. 13/625,109, filed Sep. 24, 2012, now U.S. Pat. No. 9,174,088, which is a continuation-in-part of U.S. patent application Ser. No. 12/755,605, filed Apr. 7, 2010, now U.S. Pat. No. 8,414,428, the entire disclosures of which are hereby incorporated herein by reference.

FIELD OF THE INVENTION

The invention relates in general to an improved mold for forming a golf ball having a non-planar parting surface for seamless appearing golf balls.

BACKGROUND OF THE INVENTION

The usual golf ball manufacturing techniques include several different steps, depending on the type of ball, such as one, two, three or even more than three-piece balls. According to the traditional method, a solid or composite elastomeric core is made, and an outer dimpled cover is formed around the core.

The two standard methods for molding a cover over a core or a core and inner layers are compression molding and injection molding. Compression molding is accomplished by using a pair of hemispherical molds each of which has an array of protrusions machined or otherwise provided in its cavity, and those protrusions form the dimple pattern on the periphery of the golf ball during the cover molding operation. A pair of blanks, having a hemispherical shape, is placed in diametrically opposed positions on the golf ball body and the body with the cover blanks thereon are placed in the hemispherical molds, and then subjected to a compression molding operation. The combination of heat and pressure applied during the molding operation results in the cover blanks being fused to the golf ball body and to each other to form a unitary one-piece cover structure which encapsulates the golf ball body. In addition, the cover blanks are simultaneously molded into conformity with the interior configuration of the hemispherical molds which results in the formation of the dimple pattern on the periphery of the golf ball cover. When dimple projections are machined in the mold cavity, they are typically positioned below the theoretical parting line of the resulting mold cavity. The parting line is typically machined after the dimple forming process.

For ease of manufacturing the parting line on the cavity is machined flat and perpendicular to the dimpled surface as to provide a positive shut off preventing flowing cover material from leaking out of the mold. This dimple positioning and flat parting line results in a great circle path on the ball that is essentially void of dimples. This is commonly referred to as the equator, or parting line, or seam of the ball. Over the years dimple patterns have been developed to compensate for cosmetics and/or flight performance issues due to the presence of the seam.

As in all molding operations, when the golf ball is removed from the hemispherical molds subsequent to the molding operations, it will have molding flash, and possibly other projecting surface imperfections. The molding flash is located at the fused circular junction of the cover blanks which forms the parting line of the molds. The molding flash will therefore be on the "equator" of golf balls not having a staggered parting line.

The molding flash and possible other imperfections projecting from the surface need to be removed and this is normally accomplished by one or a combination of the following: cutting blades, sanding belts, or grinding stones, and the like. These types of processes tend to enhance the obviousness of the seam. Alternative finishing processes have been developed to minimize this effect. These processes include tumbling with media, stiff brushes, cryogenic de-flashing and the like. Regardless of the finishing process, the result has been a flat parting line in an area substantially void of dimple coverage.

When flashing is removed by grinding, it is desirable that the molding operation be accomplished in such a manner that the molding flash is located solely on the surface of the golf ball and does not extend into any of the dimples. In other words, a grinding operation may have difficulty reaching into the dimples of the golf ball to remove the molding flash without ruining the golf ball cover. Therefore, prior art hemispherical molds are primarily fabricated so that the dimple-forming protrusions formed therein are set back from the circular rims, or mouths of their cavities. The result is that the equator of a molded golf ball is devoid of dimples and the molding flash is located solely on the smooth surface provided at the equator of the golf ball.

It is well known that the dimple pattern of a golf ball is a critical factor insofar as flight characteristics of the ball are concerned. The dimples influence the lift, drag and flight stability of the golf ball. When a golf ball is struck properly, it will spin about a horizontal axis and the interaction between the dimples and the oncoming air stream will produce the desired lift, drag, and flight stability characteristics.

In order for a golf ball to achieve optimum flight consistency, its dimples must be arranged with multiple axes of symmetry. Otherwise, it might fly differently depending upon orientation. Most prior art golf balls include a single dimple free equatorial parting line, which inherently limits the number of symmetry axes to one. In order to achieve good flight consistency, it is often necessary to compensate for this limitation by adjusting the positions and/or dimensions and/or shapes of certain dimples.

For maximum performance and consistency, it is preferable to use a dimple arrangement that eliminates or hides the equatorial parting line, and it is best that it be done by including dimples that intersect the equator. Some U.S. Patents that seek to place dimples upon the equator of the ball include U.S. Pat. No. 6,632,078 to Ogg et al., U.S. Pat. Nos. 6,200,232, 6,123,534 and 5,688,193 to Kasashima et al., U.S. Pat. No. 5,840,351 to Inoue et al., and U.S. Pat. No. 4,653,758 to Solheim. These patents introduced "stepped" and/or "zig zag" parting lines. While this could potentially improve compliance with the symmetry, they did not sufficiently improve dimple coverage, since the parting lines included straight segments that did not permit interdigitation of dimples from opposite sides of the equator. A stepped path often results in a greater loss of dimple coverage than a straight path because it discourages interdigitation for a larger number of dimples. U.S. Pat. No. 6,936,208 to Ogg teaches the formulation of a partial or continuous tab created by overlapping of adjacent concave and convex tabs to reduce the dimension of the seam about the ball.

Therefore, a need exists for a mold to create a new and improved golf ball having a parting line configuration providing sufficient relief to minimize dimple damage during flash removal, improve symmetry performance, increase surface coverage, minimize the visual impact of the equator, and reduce the amount and effort for removing flash.

SUMMARY OF THE INVENTION

The present invention is directed to a golf ball having a non-planar parting line comprising a series of arcs. Such parting line may be useful for dimple designs where one or more manufacturing vulnerabilities are encountered during cavity production.

One such vulnerability is having a large size disparity between dimples in one hemisphere and adjacent dimples from the opposing hemisphere. The parting line is produced by a pair of adjacent dimples, wherein D(N) indicates the dimple diameter from the dimple on the Northern hemisphere and D(S) indicates the dimple diameter from the dimple on the Southern hemisphere. A large disparity may be created, if the following condition is satisfied:

$$\frac{D(N)}{D(S)} > 1.25 \text{ or } \frac{D(N)}{D(S)} < 0.80$$

or more preferably if:

$$\frac{D(N)}{D(S)} > 1.40 \text{ or } \frac{D(N)}{D(S)} < 0.70$$

A second possible vulnerability may be encountered if adjacent dimples from opposing hemispheres are heavily weighted towards one hemisphere over the other. This is determined by the dimple radius preference coefficient which is calculated by the percentage of each dimple radius that lies within each hemisphere, R(N) and R(S). The percentage of R(N) that lies within the Northern hemisphere is α(N), and the percentage in the Southern hemisphere is β(N). Likewise, the percentage of R(S) that lies within the Northern hemisphere is α(S), and the percentage in the Southern hemisphere is β(S), and α and β are always between zero and one, and α(N)+β(N)=1, and α(S)+β(S)=1. Another parameter is the distance from the center of a dimple to the equator. The distance from the center of a Northern dimple to the equator is δ(N), and the distance from the center of a Southern dimple to the equator is δ(S). The dimple radius preference coefficient ($C_{RP}$), is defined as:

$$C_{RP} = \left(\frac{\delta(S)R(N)}{\delta(N)R(S)}\right)\left(\frac{\beta(N)R(N)+\beta(S)R(S)}{\alpha(N)R(N)+\alpha(S)R(S)}\right)$$

$C_{RP}$>1.5→indicates it is weighted towards the North, and
$C_{RP}$<0.66→indicates it is weighted towards the South.
In a particular embodiment,
$C_{RP}$>2.0→further indicating it is weighted towards the North, or
$C_{RP}$<0.5→further indicating it is weighted towards the South.

A third possible vulnerability may exist if a wave design utilizing an arc concentric to an adjacent dimple provides inadequate relief from the dimple perimeter. More specifically, a wave arc positioned about a dimple that maintains its tangency with the connecting lines and is concentric with the dimple, has a wave relief (Δ) measured as the distance from the dimple edge to the arc. If that distance is less than or equal to 0.002 inches, then a non-concentric arc might be beneficial.

Non-concentric wave arcs are created about the dimples, similar to those as indicated by A2 and A3. Any newly defined arc should maintain a tangency with its connecting lines and keep these properties:

1) The wave relief (Δ) should be greater than 0.002 inches.

$$\Delta > 0.002$$

2) The radius of the newly defined non-concentric arc ($r_A$) should relate to its corresponding dimple perimeter diameter (D) such that:

$$r_A < \frac{D}{2} \text{ and } r_A > (0.10)\frac{D}{2}$$

3) Knowing that the newly defined arc is not concentric with the dimple perimeter, it need not lie exactly in the same longitudinal plane as the dimple center. It is to be considered herein that a longitudinal plane through the dimple center can differ from a plane comprising the center of the corresponding non-concentric arc $L_1$ and a vertical axis through the center of the ball. The angle between these planes is the arc shift angle (θ), defined in radians, and is related to the dimple diameter (D) such that:

$$\theta \leq \frac{\pi D}{6}$$

In a particular embodiment, golf balls having a non-planar parting line about non-circular dimples. In a particular aspect of this embodiment, the parting line comprises non-concentric arcs having straight connecting line segments between the arcs. Each arc maintains a tangency with its connecting lines and a relief distance greater than or equal to 0.003 inches when measured from an average non-circular dimple diameter to one of the non-concentric arcs and an absolute relief distance of at least 0.001 inches when measured from all points on the non-circular dimple perimeter to one of the non-concentric arcs. A radius of each non-concentric arc relates to a corresponding average non-circular dimple perimeter diameter according to the equations:

$$r_A < \frac{\mu_d}{2} \text{ and } r_A > (0.10)\frac{\mu_d}{2}$$

where $r_A$ is the radius of a non-concentric arc. The average non-circular dimple diameter, $\mu_d$, is found using the following equation:

$$\mu_a = \sum_{i=0}^{n} \frac{2r_i}{n} \text{ and } n \geq 25$$

where $r_i$ is the distance from the dimple plan shape centroid to a number of n points on the dimple perimeter.

The golf ball may include a plane comprising a non-circular dimple center and the vertical axis through the center of the ball, and another plane comprising the center of a corresponding non-concentric arc and said vertical axis through the center of the ball. These planes create an arc shift angle defined to the average non-circular dimple perimeter diameter by the equation:

$$\theta \leq \frac{\pi \mu_d}{6}$$

where $\theta$ is the arc shift angle in radians.

Adjacent non-circular dimples on opposing hemisphere sides of the parting line may have a large size disparity which is defined by the equation:

$$\frac{\mu_d(N)}{\mu_d(S)} > 1.25 \text{ or } \frac{\mu_d(N)}{\mu_d(S)} < 0.80$$

where $\mu_d$ (N) is the average diameter of a non-circular dimple in the Northern hemisphere of the ball, and $\mu_d$ (S) is the average diameter of a non-circular dimple in the Southern hemisphere. Preferably, the size disparity is defined by the equation:

$$\frac{\mu_d(N)}{\mu_d(S)} > 1.40 \text{ or } \frac{\mu_d(N)}{\mu_d(S)} < 0.70$$

Using the dimple radius preference coefficient $C_{RP}$ defined above, adjacent non-circular dimples on opposing hemisphere sides of the parting line are weighted more towards one hemisphere over the other, based on the equation:

$$C_{RP} > 1.5 \text{ or } C_{RP} < 0.66$$

where $C_{RP}$ is the dimple radius preference coefficient. Preferably, adjacent non-circular dimples on opposing hemisphere sides of the parting line are weighted more towards one hemisphere over the other, based on the equation:

$$C_{RP} > 2.0 \text{ or } C_{RP} < 0.50$$

In another embodiment, the present invention provides a golf ball having a non-planar parting line and comprising a plurality of dimples located adjacent to the parting line, wherein the parting line consists of a plurality of arcs and a plurality of straight line segments, and wherein each arc that is connected at an end to a straight line segment maintains a tangency with the straight line segment; each arc that is connected at an end to another arc maintains a tangency with the arc; each dimple located adjacent to the parting line has an absolute relief distance, measured as the shortest distance from the parting line to the perimeter of the dimple, of 0.005 inches or less; and the sum of the lengths of the arcs relates to the sum of the straight line segments according to the equation: (0.15) $\Sigma L_{ARCS} \leq \Sigma L_{LINES} \leq (0.50) \Sigma L_{ARCS}$. In a particular aspect of this embodiment, the plurality of dimples located adjacent to the parting line consists of dimples having a circular plan shape. In another particular aspect of this embodiment, the plurality of dimples located adjacent to the parting line includes non-circular dimples. In a further particular aspect of this embodiment, the plurality of non-circular dimples located adjacent to the parting line includes non-circular dimples that have an average dimple diameter that intersects the non-planar parting line. In another further particular aspect of this embodiment, the plurality of non-circular dimples located adjacent to the parting line comprises non-circular dimples that have a wave relief, measured as the shortest distance from the average dimple diameter of the dimple to the parting line, that is less than the absolute relief distance of the dimple.

It is appreciated that the golf ball may have both non-circular dimples and circular dimples and that the non-circular dimples and circular dimples may both be provided adjacent the non-planar parting line.

In a particular aspect of any of the non-planar parting lines disclosed herein, the plurality of dimples located adjacent to the parting line consists of a first portion of dimples, each dimple of the first portion having a wave relief distance of from 0.001 inches and 0.005 inches, and a second portion of dimples, each dimple of the second portion having a wave relief distance of 0.008 inches or greater, where wave relief distance is measured as the shortest distance from the average dimple diameter of the dimple to the parting line.

In another particular aspect of any of the non-planar parting lines disclosed herein, at least a portion of the parting line includes at least one intermediate arc connecting two main arcs defining the non-planar parting line. More specifically, at least a portion of the parting line includes a first main arc adjacent to a first dimple, a second main arc adjacent to a second dimple located on the opposing side of the parting line from the first dimple, and at least one intermediate arc connecting the first main arc and the second main arc. Each main arc is independently selected from concentric arcs and non-concentric arcs, as defined herein. One of ordinary skill in the art will readily ascertain the distinction between the main arcs and the intermediate arcs defining the parting line.

The golf ball may have the dimple pattern of, a tetrahedral based pattern, an icosahedral based pattern, an octahedral based pattern, a cube-octahedral dimple pattern or a hexagonal dipyramid dimple pattern.

The present invention is also directed to a mold for forming a cover for a golf ball having a non-planar parting line. The mold comprises hemispherical upper and lower mold halves, each mold half having a non-planar mold parting surface, a spherical interior cavity surface, and an edge break connecting the mold parting surface and the interior cavity surface. The edge break has an arcuate profile shape and the same concavity as the interior cavity surface.

BRIEF DESCRIPTION OF THE DRAWINGS

FIG. 3A is an enlarged view of A on FIG. 3.

DETAILED DESCRIPTION

Figure 1:
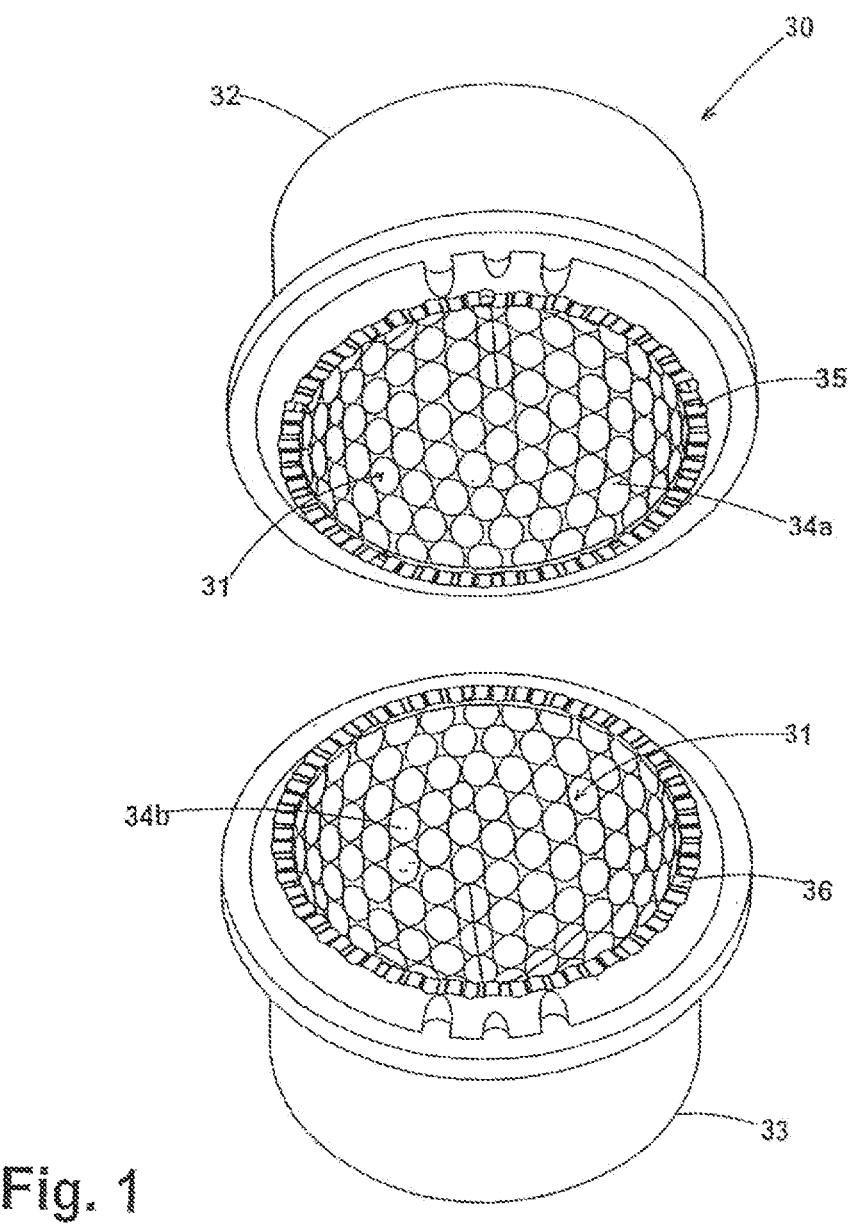
FIG. 1 is an enlarged pictorial expanded view of the mold comprising both mold halves showing the vents on the upper mold half.
Figure 2A:
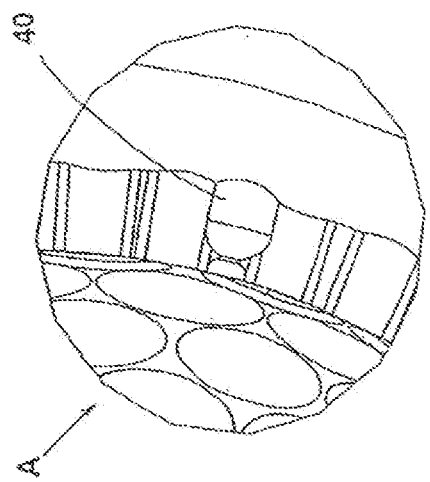
FIG. 2A is an enlarged view of A on FIG. 2.
Figure 2B:
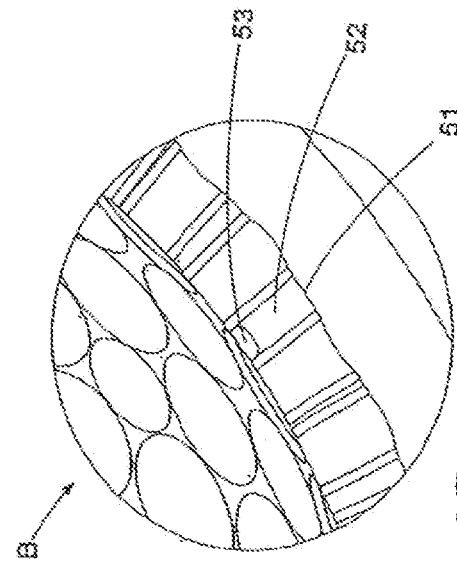
FIG. 2B is an enlarged view of B on FIG. 2.
Figure 2:
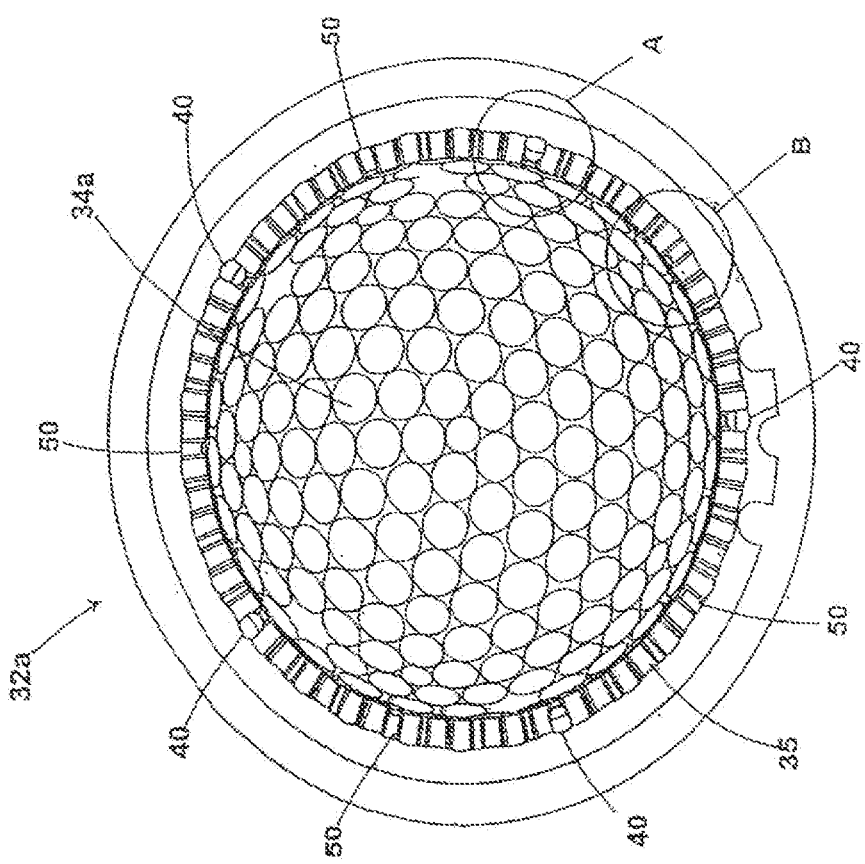
FIG. 2 is a plan view of the upper mold half for a mold designed for a Urethane covered ball.
Figure 3:
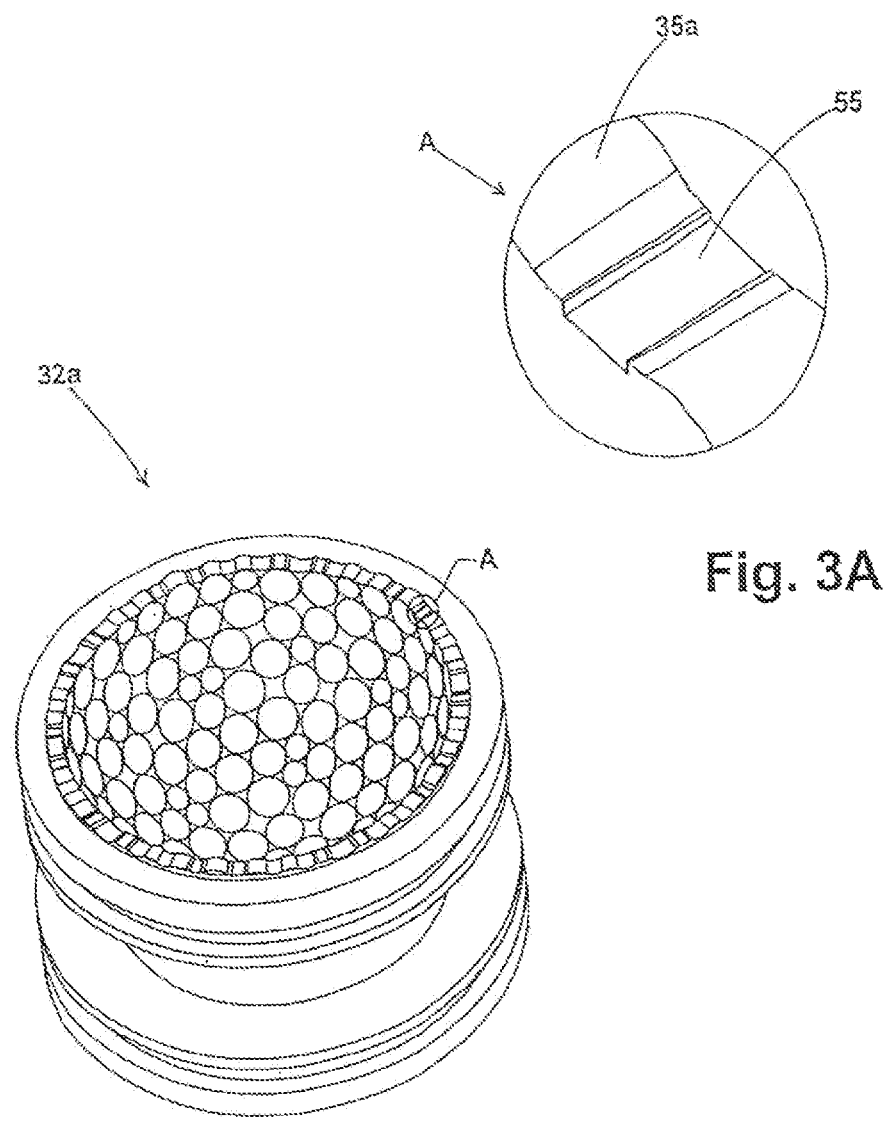
FIG. 3 is a pictorial view of an upper mold describing a vent designed for a Surlyn covered ball.

Referring to FIGS. 1 to 4, wherein an improved mold is shown, with the mold being indicated by the reference numeral 30, the mold 30 having a spherical cavity 31 which is used to form a cover for a golf ball wherein the mold 30 comprises hemispherical mold halves, an upper mold half 32 and a lower mold half 33, both halves having interior dimple cavity details 34*a* and 34*b* respectively with the details of the upper mold half 34*a* shown in FIGS. 2, 2A and 2B, for a mold designed to form a castable cover over a core, and in FIGS. 3 and 3A, for a mold designed to form a cover made from Surlyn, and when these halves are mated they define a dimple arrangement therein. Any dimple arrangement, such as icosahedral, octahedral, cube-octahedral, dipyramid, and the like could be used. Although the preferred dimple is circular when viewed from above, the dimples may be oval, triangular, square, pentagonal, hexagonal, heptagonal, octagonal, etc. Possible cross-sectional shapes include, but are not limited to, circular arc, truncated cone, flattened trapezoid, and profiles defined by a parabolic curve, ellipse, semi-spherical curve, saucer-shaped curve, or sine curve. Other possible dimple designs include dimples within dimples and constant depth dimples. In addition, more than one shape or type of dimple may be used on a single ball, if desired.

Figure 4:
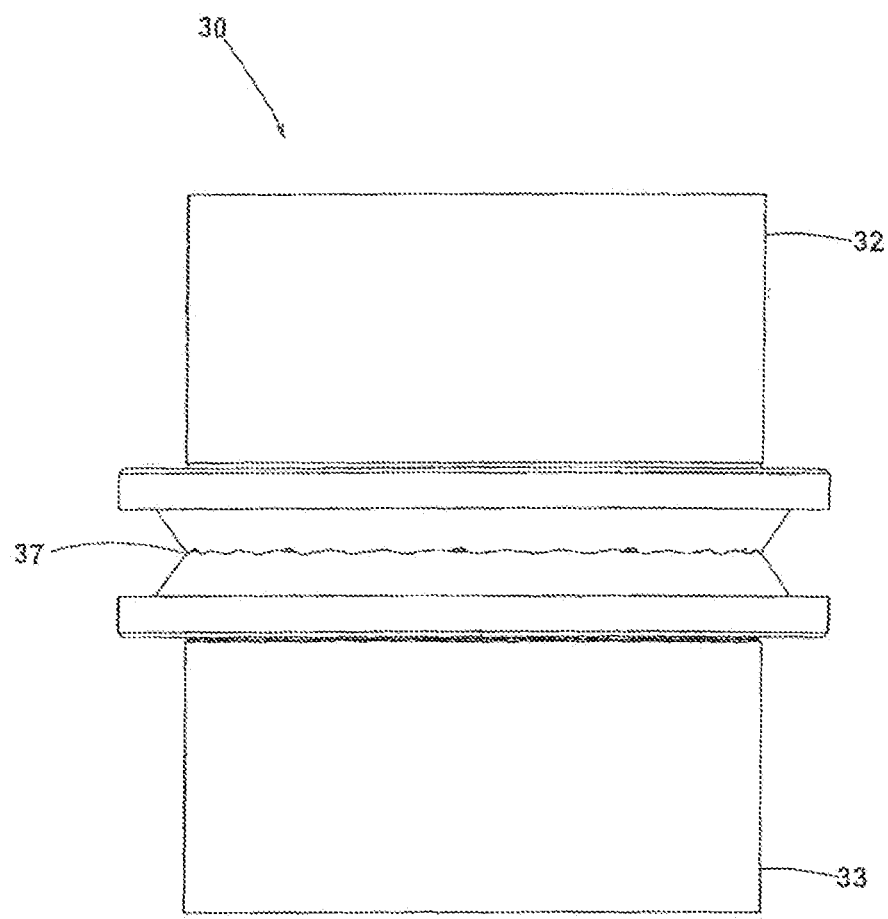
FIG. 4 is a pictorial view of a completed mold's non-planar parting line.

The upper and lower mold halves 32 and 33 have non-planar parting line surfaces 35 and 36 respectively, which are staggered as shown best in FIG. 4, each surface 35 and 36 comprising a plurality of peaks and valleys which are created by a method of defining, modeling, and manufacturing, by using a computerized modeling system as discussed below. When assembled the non-planar parting line 37 follows the dimple outline pattern and allows the dimples of one mold half to interdigitate with the dimples of the mating mold half, to form a golf ball of substantially seamless appearance.

The non-planar parting line 37 is machined to follow the profile of the equator dimples. Typically, the non-planar parting line 37, as it is machined, is offset from the equator dimples by at least 0.001 inch, as to not interfere with the dimple perimeter. This produces the wavy or corrugated formed parting line consisting of multiple peaks and valleys. Typically, the peaks (the highest point of the parting line) are located above the theoretical center of the cavity half and the valleys (the lowest point) are located below the theoretical center of the cavity half. This offset distance of the peaks and valleys can be as much as about half the dimple diameter or as little as 0.001 inch. Designs which incorporate as little as 0.001 inch offset, provide the benefit of interdigitating dimples, yet only producing a small amount of undercut in the cavity. This alternating geometry is consistent over the entire parting line surfaces of both mold halves 32 and 33.

Figure 31:
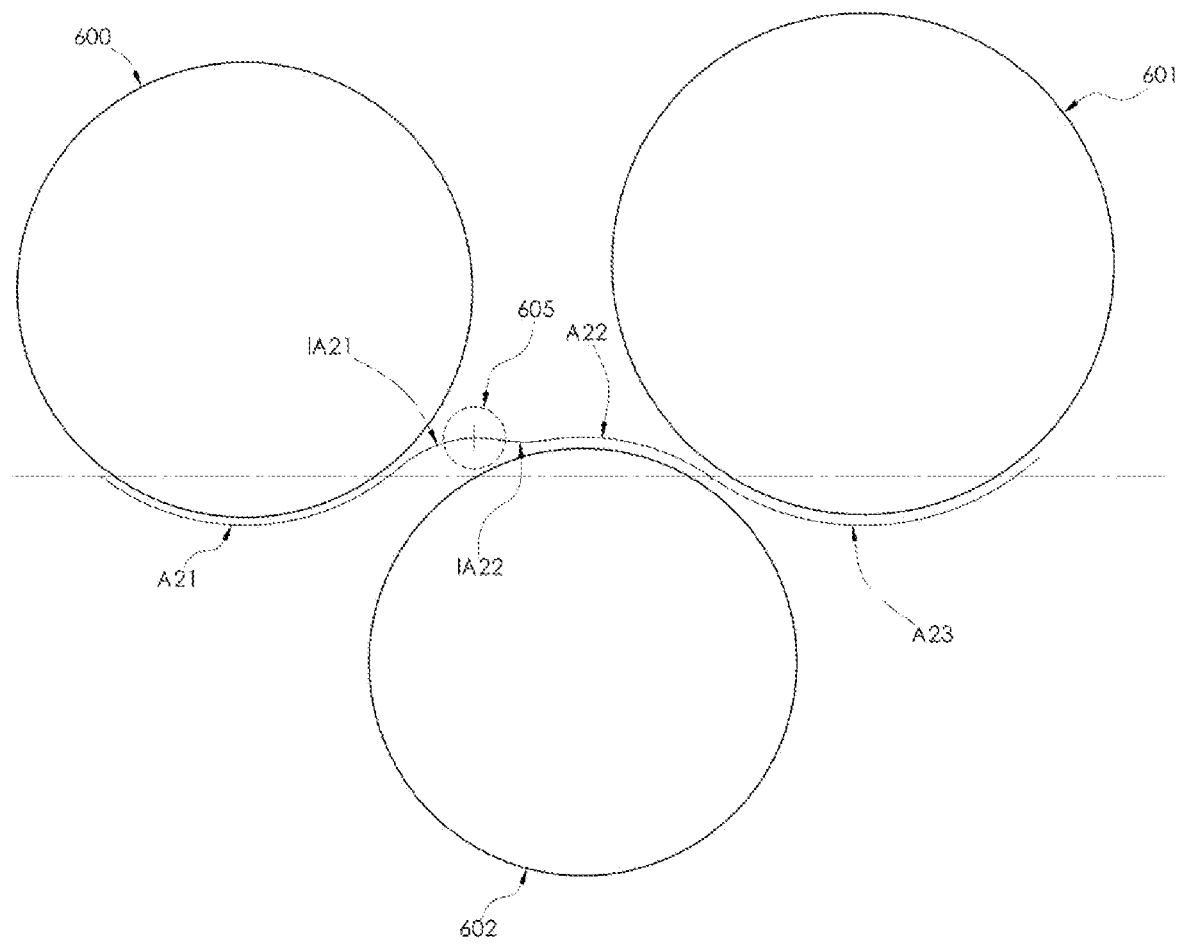
FIG. 31 illustrates dimples adjacent to a portion of a non-planar parting line according to an embodiment of the present invention.

In a particular embodiment, each of the upper and lower mold halves include an edge break connecting the mold parting surface with the interior cavity surface. For example, FIG. 31 shows a portion of a mold half 65 including an edge break 60 connecting mold parting surface 64 with interior cavity surface 63. In the example illustrated in FIG. 31, mold half 65 includes a gate used for injection molding golf ball covers, and an edge break 62 connects gate surface 61 with interior cavity surface 63. Edge break 62 preferably has the same design, i.e., same shape and radius, as edge break 60.

Figure 32:
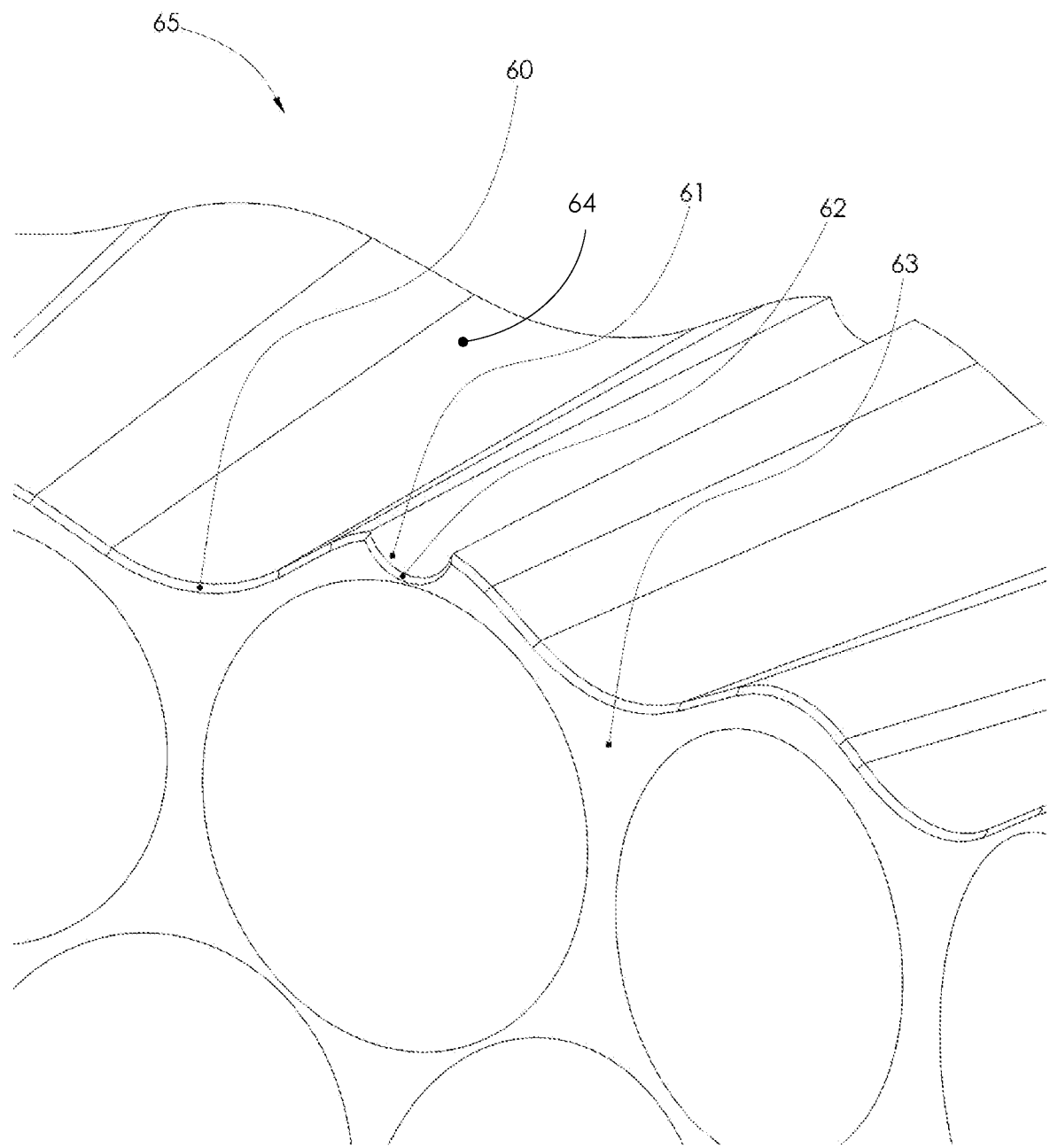
FIG. 32 illustrates a perspective view of a portion of a mold half according to an embodiment of the present invention.
Figure 33:
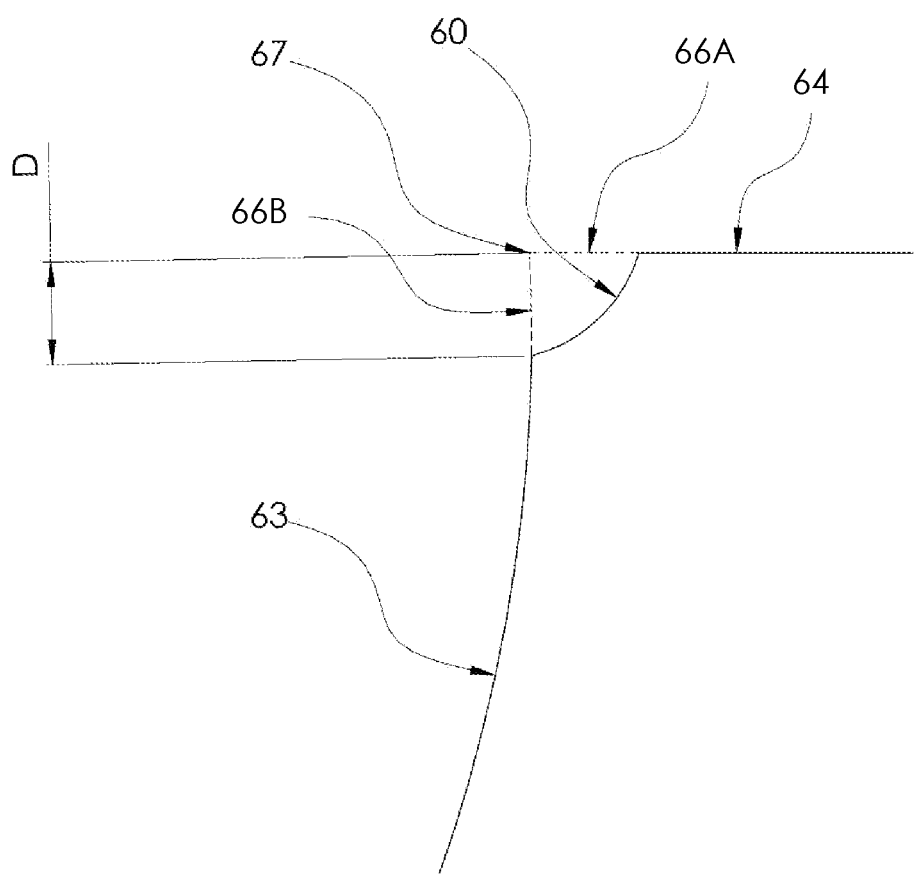
FIG. 33 illustrates a cross-sectional view of a portion of a mold half having an edge break according to the present invention.

In a particular aspect of this embodiment, the edge break connecting the mold parting surface with the interior cavity surface has an arcuate profile shape and has the same concavity as the spherical interior cavity surface. In a further particular aspect of this embodiment, the edge break has a radius within a range having a lower limit of 0.005 inches and an upper limit of 0.020 inches or 0.030 inches or 0.050 inches or 0.063 inches. In another further particular aspect of this embodiment, the distance from the surface of the edge break at the point of intersection between the edge break and the interior cavity surface to the theoretical cavity edge is from 0.0005 inches to 0.0050 inches. The location of the theoretical cavity edge can be determined in the profile view of the mold half by drawing a linear extension of the mold parting surface until it intersects with a drawing of an extension of the arc defining the interior cavity surface. The theoretical cavity edge is located at this point of intersection between the extension of the mold parting surface and the extension of the interior cavity surface. For example, as shown in FIG. 32, which is a cross-sectional view of a portion of the mold half illustrated in FIG. 31, edge break 60 connecting mold parting surface 64 with interior cavity surface 63 has an arcuate profile shape. In the example illustrated in FIG. 32, edge break 60 has a radius of about 0.010 inches, and the distance D from the surface of edge break 60 at the point of intersection between edge break 60 and interior cavity surface 63 to theoretical cavity edge 67 is about 0.0026 inches. Theoretical cavity edge 67 is located at the intersection of a line 66A drawn as an extension of mold parting surface 64 in the profile view and an arc 66B drawn as an extension of interior cavity surface 63 in the profile view.

The cavity design of the present invention can be applied for any golf ball molding process including injection molding, compression molding and casting. It will also work with the standard flat parting line as well as non-planar parting lines used to manufacture "seamless" golf balls. Likewise, edge breaks of the present invention are particularly useful in the mold halves used to form golf ball cover layers, including injection molded thermoplastic polyurethane cover layers, injection molded ionomer cover layers, cast polyurethane cover layers, compression molded thermoplastic polyurethane cover layers, and compression molded ionomer cover layers, and can also be used for molding golf ball core and casing layers.

The cavity design of the invention incorporates the above method for creating the staggered rim definition necessary for the non-planar parting line on the golf ball. The design principles as discussed below apply whether the ball has a Surlyn or a castable cover, such as urethane. However, as discussed above the molds have a differing construction depending upon the cover material.

Most "seamless" molding methods today define groups of dimples that traverse back and forth across the theoretical mid-plane of a non-planar parting line. The above described method of the invention defines a method whereby the position of each dimple can be easily and individually defined (not as a group of dimples) thereby identifying the undulating surface of the cavity, regardless of the dimple pattern.

A concept of the improved mold is shown on FIGS. 2, 2A, and 2B, which illustrate the upper mold 32 having a mold surface 35 for mating with the lower mold 33 for creating castable covered balls. The non-planar parting line cavity design of the present invention incorporates the use of 3 or more equally spaced vents (sprues) and this depends on the dimple pattern. As shown, FIGS. 2, 2A, 2B depict five (5) true vents 40 and five (5) false vents 50. The design of the false vents 50 (FIG. 2B) is such that a small section of material (a "tab") is intentionally molded onto the ball and stays attached to the ball until the knifing process wherein they are removed. This tab is a result of the land area 51 having a partially dammed-up section 52 allowing for a relatively small recess 53 to fill with cover material therein creating the "tab". In addition to the false vents 50, this cavity design incorporates the use of five (5) true vents 40 which are depicted in detail in FIG. 2A. The true vents 40 function primarily to provide a vent for trapped air and/or excess material to pack around the core and flow out of the cavity as needed. As stated above, only the upper mold 32 contains vents 40 and 50, however, it is to be appreciated that both molds 32 and 33 could contain vents 40 and 50 and still be within the scope of the invention.

FIGS. 3 and 3A depict an upper mold 32a for molding Surlyn as a cover material. When molding Surlyn covers the mold does not contain false vents 50, but rather open vents 55 which extend across the entire mold surface 35a.

Regardless of whether the cover material is Surlyn, and therein formed by either compression molding or retractable pin molding, or whether it has a castable cover, such as urethane or urea, the resulting golf ball can have a "seamless" appearance.

The combination of three factors, first, a non-planar parting line, secondly, tabs molded and left behind from the real vents, and thirdly, the tabs that are molded in from the false vents, allows for a seamless ball to be oriented as it enters the buffing machine. When golf balls are spun on the orienting stations of the buffing machine, the molded-in tabs provide location of the actual buffing line. If alignment is not complete in a pre-determined amount of time, the ball will not be buffed and will be rejected as an un-buffed ball, which will require another pass through the machine at a later time. One of the key concepts of the invention is the creation of the tabs that will minimize the amount of excess flash that must be removed therein saving both time and wasted material. The maximum amount of tab material needed to be removed will be held to less than 15% of the circumference. Another inherent advantage of the tabs as created by the invention is that their removal can be done by a cutting knife which is a time saver over buffing or grinding off the flash.

The non-planar parting line of the above mold 30 is a result of incorporating into a mold a cavity design having a staggered rim definition (non-planar parting surface) which is created by using a computerized modeling system such as CAD (Computer Aided Design), CAE (Computer Aided Engineering), or similar type of system, along with a CNC machine tool. Preferably, the modeling system incorporates parametric 3-dimensional solid modeling capabilities that are required to properly manufacture and process Surlyn or castable covered golf balls which are often referred to as "seamless" golf balls.

Most dimple patterns incorporate repeating segments that are used to define the overall dimple arrangement. In such cases, it is only necessary to model a portion or portions of the golf ball or mold that are sufficient to define the entire golf ball or mold.

Molds with non-planar parting surfaces can be used to manufacture so-called "seamless" golf balls, in which the parting line on the molded product is not a great circle. Rather, it typically incorporates waveforms, steps, or other features that permit it to pass around and between interdigitated dimples without intersecting them. Once the parting line artifacts are removed through buffing and other finishing processes, the ball has a seamless appearance.

Figure 5:
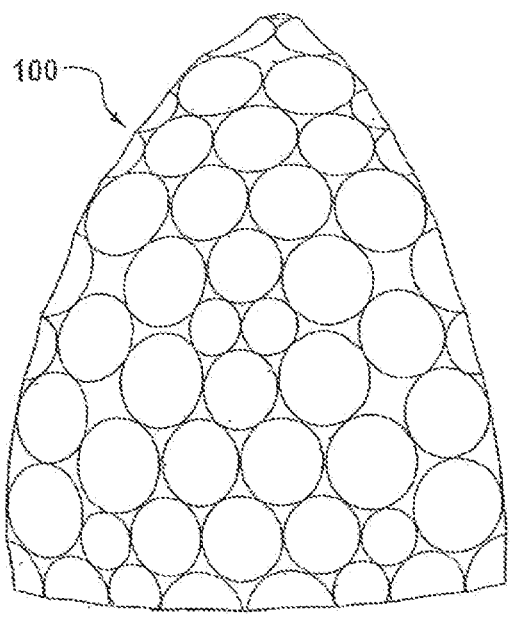
FIG. 5 is a golf ball segment model based upon the method of defining a parting surface of the present invention.

The method of the present invention utilizes six basic steps to achieve a seamless appearance. The steps are:

(1) Creating a 3-dimensional computer model representing the golf ball. The model may be constructed in many different ways that will depend on the particular system being used and the preferences of the designer constructing the model. It is generally preferred to work with the smallest ball segment that is sufficient to fully define the dimple pattern. FIG. 5 shows an example of a golf ball segment model 100.

Figure 6:
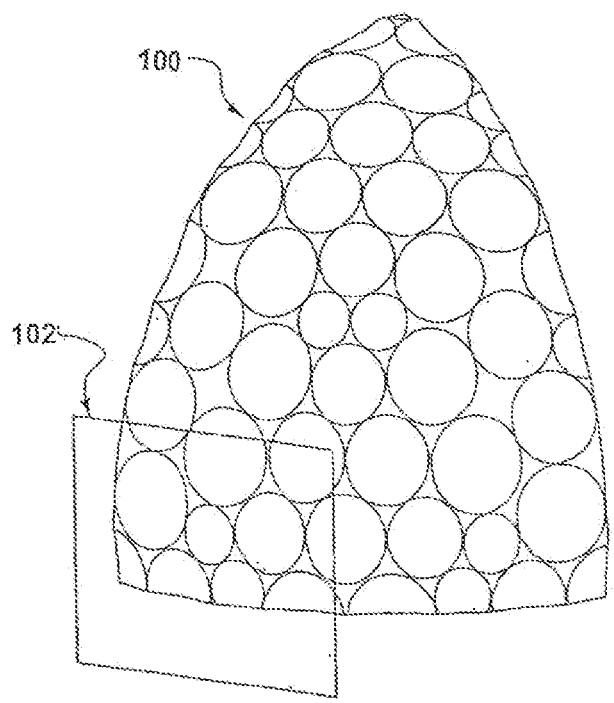
FIG. 6 is a golf ball segment illustrating a parting line profile construction.
Figure 7:
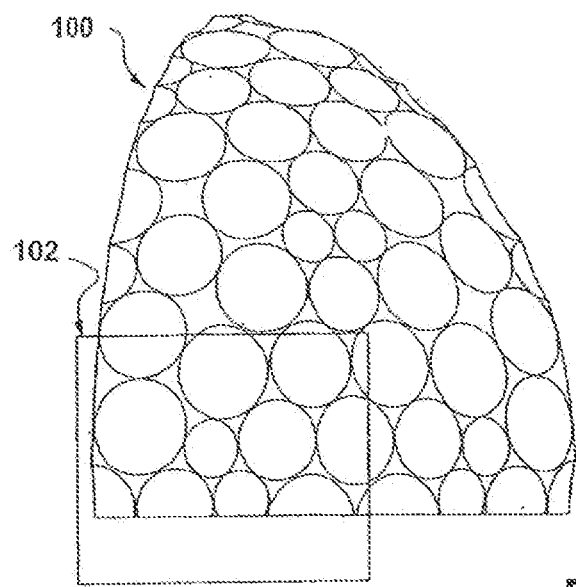
FIG. 7 is a view normal to the construction plane of FIG. 6.
Figure 8:
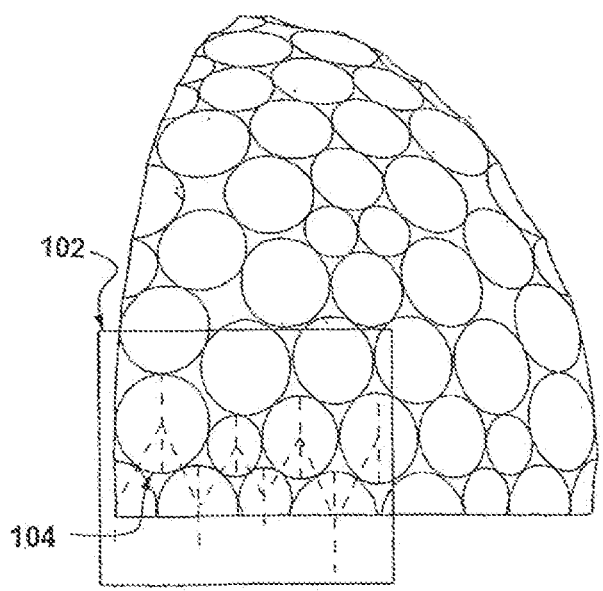
FIG. 8 illustrates arc segments that are constrained to be concentric with the neighboring dimples.

(2) Constructing a parting line profile plane as a 2-dimensional curve on a conveniently positioned plane. It is preferred to position the plane 102 parallel to the polar axis of the ball, at a distance that is greater than the radius of the ball. Such a plane is shown in FIG. 6. To construct a parting line profile 104, it is convenient to use a view direction that is normal to the plane, as shown in FIGS. 7 and 8, wherein the profile 104 can then be constructed of arc segments, line segments, or any other type of curve component that the particular system supports. Typically, the profile 104 will weave a path around and between dimples without intersecting them. It is very beneficial to define the profile geometry in a parametric fashion using references and constraints based on the dimple pattern geometry. For example, the profile 104 in FIG. 8 comprises arc segments that are constrained to be concentric with the neighboring dimples, with a radius parameter that is defined to be a particular value greater than the dimple radius. It is required that the curve segments be continuous with one another, and it is preferred that they be tangent as well wherever possible. In this example, because of mirror symmetry inherent in the dimple pattern, it is only necessary to create the parting line profile 104 for half of the ball segment shown.

Figure 9:
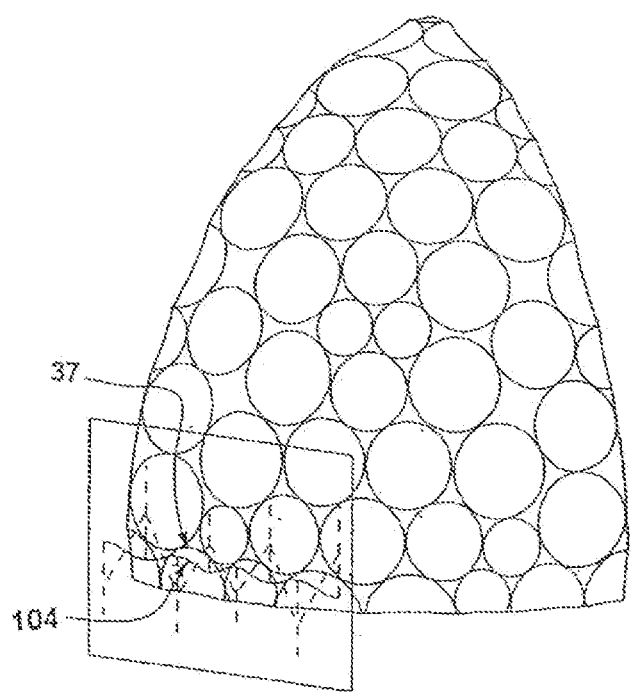
FIG. 9 projects the 2-dimensional parting line profile upon the surface of the ball to create a 3-dimensional parting line path.

(3) Creating the parting line 37 by projecting the parting line profile 104 onto the 3-dimensional surface of the golf ball model as shown in FIG. 9. The projection is performed along a direction chosen to properly position the parting line of the ball, which will typically be normal to the plane of the 2-dimensional parting line profile 104. In this case, the remaining half of the parting line is created as a mirror image.

Figure 10:
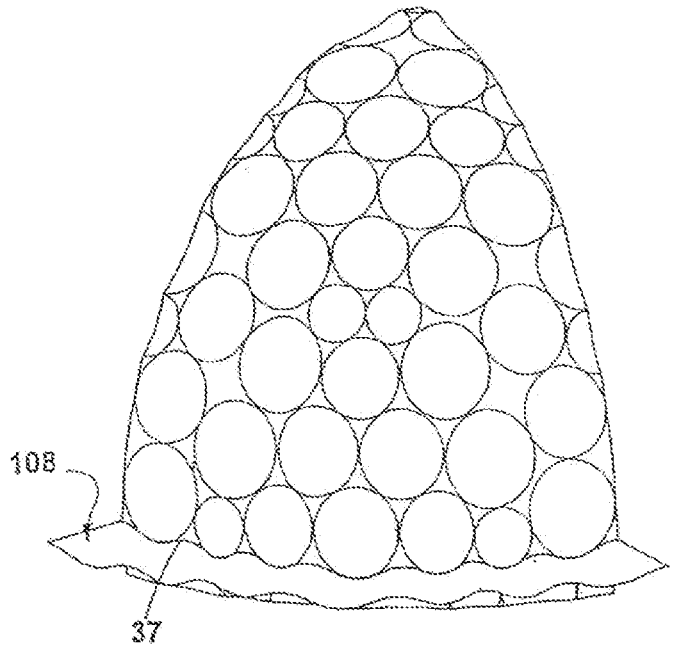
FIG. 10 utilizes the parting line path of FIG. 9 as a profile to generate a radiated geometry component to define the parting surface of the golf ball mold.
Figure 11:
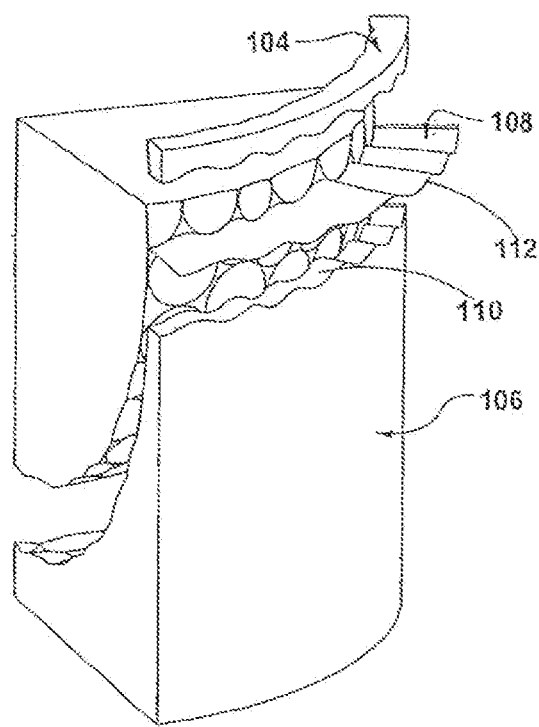
FIG. 11 is an exploded view to show how the radiated component of FIG. 10 is used to form the parting surface of a mold cavity model.

(4) Generating a radiated surface 108 containing the parting line 37 and defining the mold parting surface 110. As shown in FIGS. 10-11, the parting line path is used as a profile to generate a radiated geometry component 112 that defines the parting surface of the golf ball mold. Depending on the particular system being used and the preferences of the designer, the geometry component 112 could be a radiated surface component 112 (as shown), or a radial extrusion solid component, or another type of radiated component. The radiated component 112 may be created as part of the golf ball model or as part of the mold model. It is preferred that the origin of the radiation is located along the polar axis of the ball or the mold cavity, and the direction of the radiation is parallel to the equator plane of the ball or mold cavity.

(5) Using the radiated surface 108 to form the parting surface of the golf ball mold. An example of an exploded view is shown on FIG. 11, wherein a cut operation can be performed using the radiated surface 108. The radiated surface 108 trims away waste material 104 along the edge of the mold, leaving the desired non-planar mold parting surface 110.

(6) Using the results of at least one of the steps 3-5 to manufacture the parting surface 110 of a golf ball mold 106. The parting surface of the golf ball mold is machined using the geometry created in the above steps. This is preferably accomplished using a CNC machine tool controlled by a program that was created directly from the model.

This method will enable a non-planar surface of any cavity to be easily defined regardless of dimple pattern.

In the manufacture of a golf ball, it is important that the parting surfaces of the molds mate very precisely. This minimizes the amount of flash and other parting line artifacts, which benefits the cosmetic quality of the finished golf ball, and it also produces greater uniformity and control over the size, weight, and roundness of the ball. Most golf ball molds employ a planar parting surface to easily provide a very precise mate. However, as previously discussed, the resulting great circle parting line on the molded ball introduces restrictions on dimple placement, which can affect the aerodynamic performance. This may manifest itself as reduced distance, reduced accuracy, or variations in performance depending on the orientation of the ball. Also, to some golfers the appearance of a great circle parting line free of dimples is not appealing.

The above embodiments utilize seamless parting lines that rely on connected arcs that are concentric to the dimples adjacent to the equator of the golf ball. While these continuous curve designed parting lines have many advantages, the machining tolerances are difficult to hold. The tight tolerances required can lead to variation in the wave among different mold halves, leading to additional flashing during the casting process. This can lead to a decrease in the buffing quality of the golf ball. Another embodiment of the invention effectively eliminates any distortions of the dimple perimeters during the CNC machining process by utilizing flat segments along the parting line.

As previously stated, the specific number of cycles is dependent upon the underlying polyhedral geometry and superposition of waveforms which are functionally dependent on the dimple pattern layout, such as described in U.S. Pat. No. 7,618,333, which is incorporated herein, in its entirety, by express reference thereto. As a minimum the waveform consists of two waveforms having base and secondary wavelengths. Preferably, there are multiple secondary waveforms. The base waveform makes an integral number of cycles around the equator of the golf ball. For a ball having a tetrahedron pattern, the repeated sub-pattern is repeated two times on the ball hemisphere. Consequently, the base waveform will have a wavelength of ½ of the ball circumference. Similarly, icosahedron patterns commonly employ five segment repetitions. A functional description of a base waveform would be as follows:

$$\gamma_{base} = \frac{\pi D}{n}$$

where $\pi D$ is the ball circumference and n is the number of repeated pattern segments.

Figure 12:
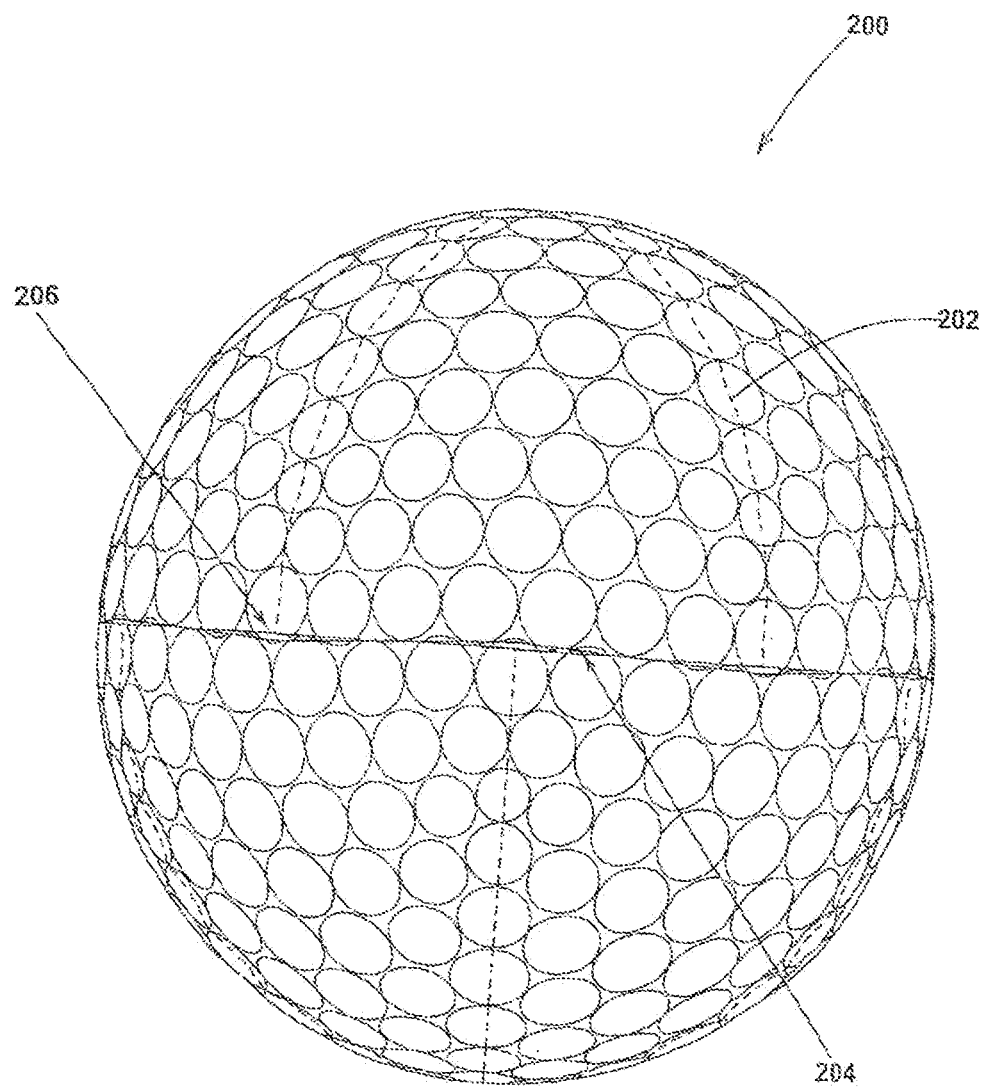
FIG. 12 is a symmetrical view of a golf ball having an icosahedron-based dimple pattern and illustrating a base waveform which is periodic, smooth, continuous and having an axis coincident with the ball equator.
Figure 13:
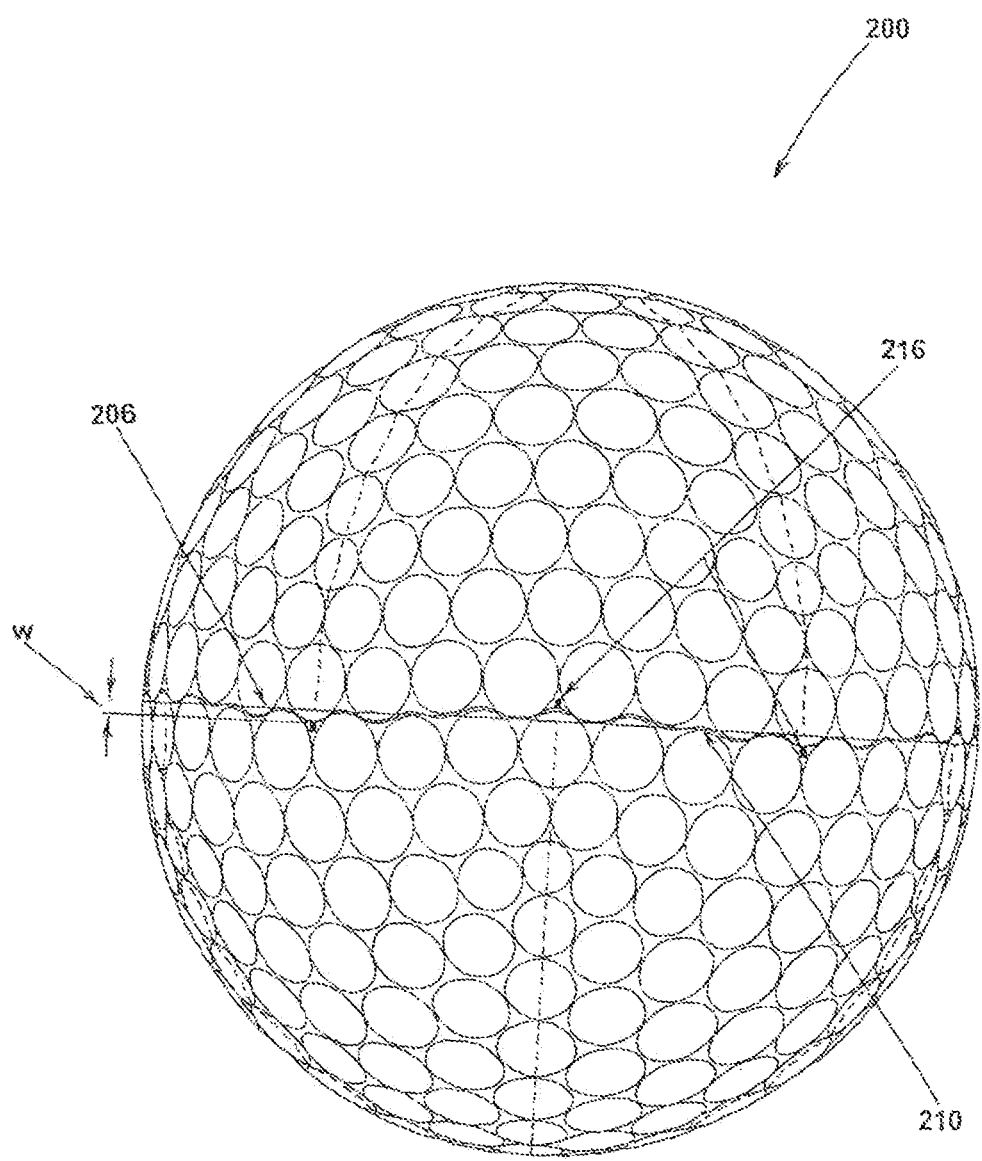
FIG. 13 is a symmetrical view of the golf ball of FIG. 12 with a secondary waveform superimposed upon the base waveform.

The golf ball 200 illustrated in FIGS. 12 and 13 illustrate this idea on an icosahedron-based pattern. The dashed lines 202 delineate the dimple pattern segments that repeat five times on each hemisphere. FIG. 12 illustrates an embodiment of the invention, that being a base waveform 204 which is periodic, smooth, continuous and having an axis coincident with the ball equator 206. Further, dimples on opposing sides of the base waveform 204 are contained predominately in only one hemisphere. Clearly, a parting line defined only by the base waveform 204 shown in FIG. 12 would result in the intersection of at least some of the dimples. This would result in mold line defects which would be difficult to eliminate in the finishing operation. As stated, to resolve this issue a secondary waveform is superimposed upon the base waveform to create a final parting line 210 as seen in FIG. 13. The secondary waveform(s) are shorter than the base waveform thereby allowing the final parting line configuration to maintain space from the dimple edges and avoid intersection dimples on opposing sides of the parting line. The secondary waveform(s) are primary defined by the individual dimples. The secondary wavelengths can be described in terms of the base wavelength in the following manner:

$$\gamma_{secondary} = \frac{\gamma_{base}}{i}$$

where i is the number of dimples per segment.

FIG. 13 shows the completed parting line 210 configuration from the base waveform 202 in FIG. 12. The high degree of dimple interdigitation minimizes land area spacing along the parting line and gives a more uniform distribution of surface coverage for improved aerodynamic symmetry. This is achieved by a modest wave amplitude w. Wave amplitude w is understood to mean the maximum deviation of the final parting line waveform 210 from its horizontal axis, namely the equator. Preferably, the final wave amplitude is 0.30 inches or less. More preferably it is 0.015 inches or less. This requirement further limits the length of the parting line to be no more than 10% greater than that of a great circle on the ball surface. More preferably the length is 6% greater or less.

The points at which the wave amplitude is a maximum are important in the manufacturing role of the mold cavity. Preferably, a minimum of three maximum points occur per mold cavity. This is necessary for a high degree of manufacturing accuracy and minimum mold wave run out.

Figure 14:
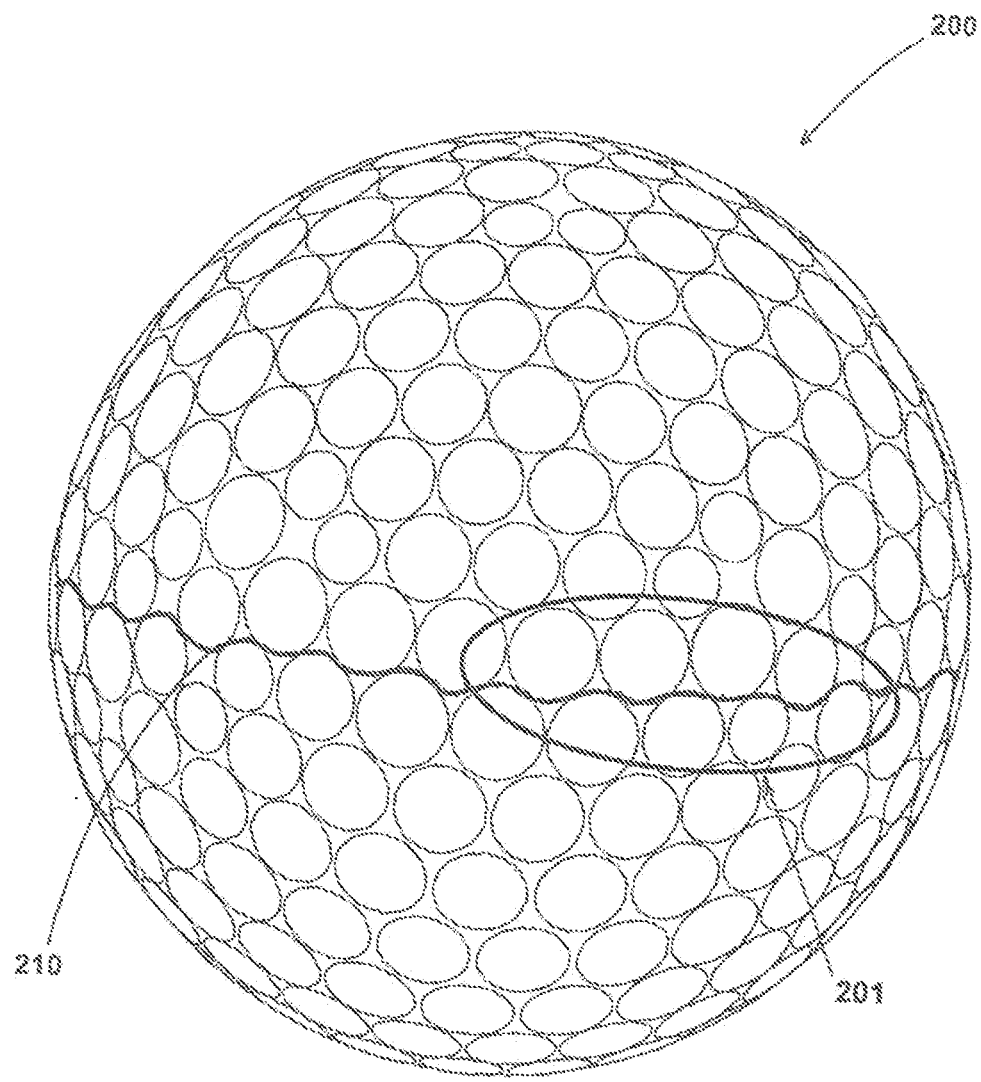
FIG. 14 is an enlarged detailed section of a final parting line configuration.
Figure 15:
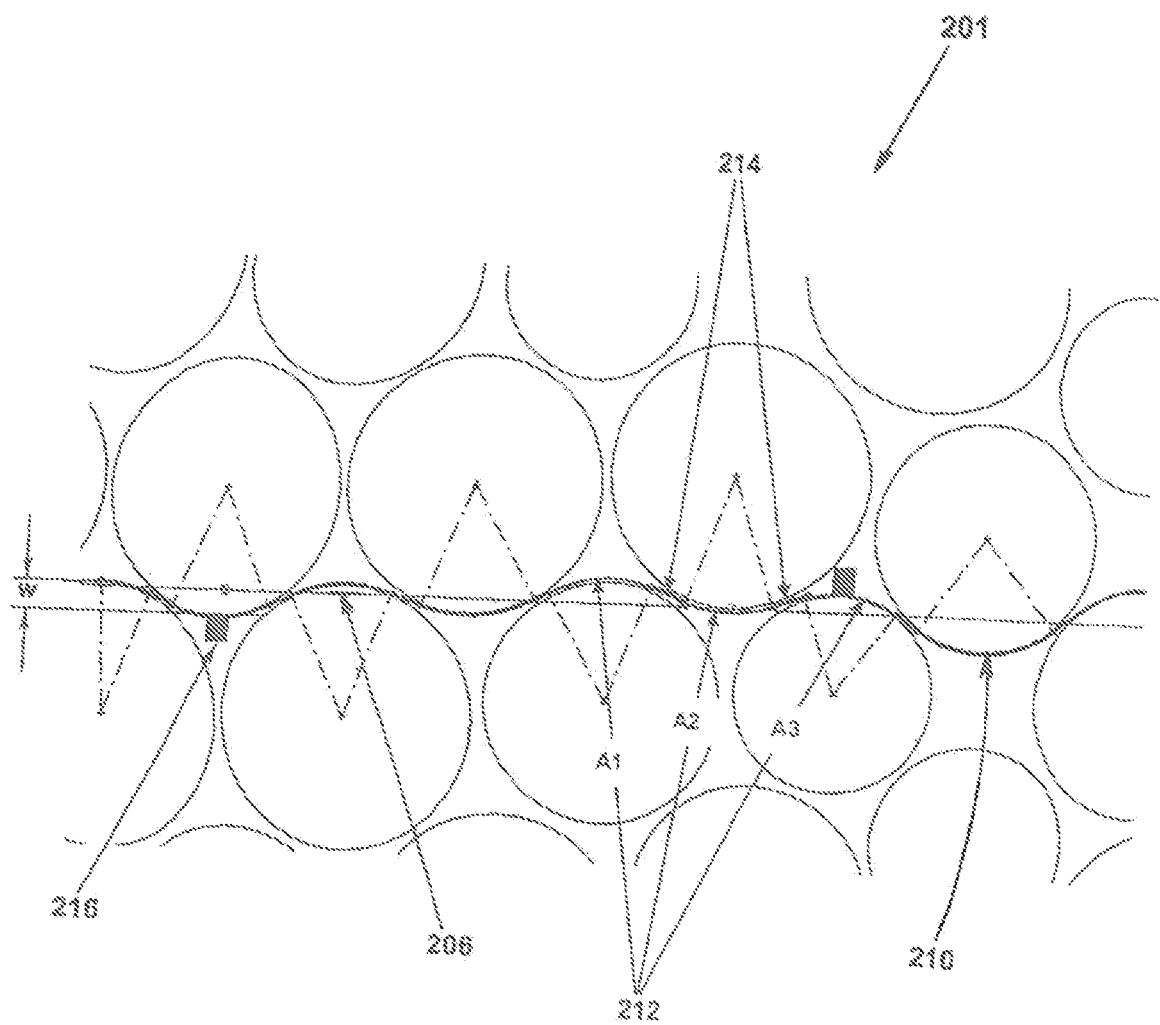
FIG. 15 is a schematic of the detail of FIG. 14 depicting the waveform of the present invention resulting from the mathematical equations involving tangent lines and arcs.
Figure 16:
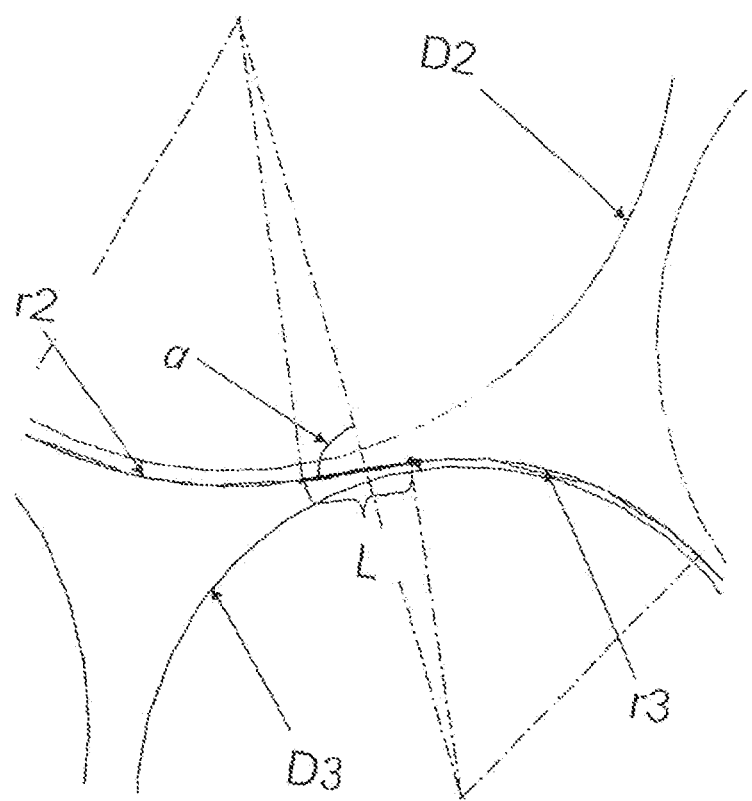
FIG. 16 is a schematic depicting the employment of straight lines tangent to the dimple arcs.

The development of the secondary waveform is described using a tetrahedral based layout like that in FIGS. 14 to 16. FIG. 14 shows a detailed section 201 of a final parting line configuration. The parting line 210 is created by first making a series of arcs 212 that follow the dimple layout. In a particular embodiment, the majority of these arcs 212 are concentric with the dimples. In another particular embodiment, a minimum of 80% of the arcs are concentric with the dimples they follow on the parting line 210. In another particular embodiment, at least 90% of the arcs are concentric. In another particular embodiment, all of the arcs 212 are concentric with the dimples they follow. The radii $r_{ARC}$ of the concentric arcs 212 are shown as $A_1$, $A_2$, and $A_3$ and they would relate to their shared dimple diameters as follows:

$$(1.005)\frac{D_{DIMPLE}}{2} \leq r_{ARC} \leq (1.06)\frac{D_{DIMPLE}}{2}$$

In a particular embodiment, adjacent arcs are connected with a straight line segment. For example, as shown in FIG. 15, adjacent arcs $A_2$ and $A_3$ are connected with a straight line 214 that is tangent to both arcs. A closer detail is shown in FIG. 16. By drawing a straight line connecting the centers of the dimples $D_2$ and $D_3$, we can determine an acute angle alpha $\alpha$. The following functional relationship between $r_2$, $r_3$, and a is satisfied to calculate the length ($L_{LINE}$) of the line tangent to both arcs:

$$L_{LINE} = \left(\frac{r_2 + r_3}{\tan\alpha}\right)$$

In a particular aspect of this embodiment, the sum of the lengths of the arcs 212 on the parting line relates to the sum of the lengths of the straight lines 214 as follows:

$$(0.15)\sum L_{ARCS} \leq \sum L_{LINES} \leq (0.50)\sum L_{ARCS}$$

where the length of the shortest line segment in the parting line ($L_{MIN}$) relates to the corresponding dimple pattern and the smallest dimple diameter in the pattern, $D_{MIN}$, such that:

$$L_{MIN} \geq (0.05)D_{MIN}.$$

In another particular aspect of this embodiment, the number of line segments, N, relates to the number of dimples, n, lying predominantly in one hemisphere and abutting the parting line as: N=2n.

Another embodiment of the present invention is the positioning of the gates 216 shown as small square blocks at local maxima on the parting line curve 210. These gates 216 are visible on the molded golf ball as small tabs. Gates 216 are placed on either side of the parting line. Their location and shape are designed to assure that a molded ball can be finished utilizing existing methods with only slight machine modification. As a minimum eight (8) gates 216 are required per molded ball hemisphere. Preferred gate dimensions, locations and count are dependent upon the dimple pattern.

Figure 17:
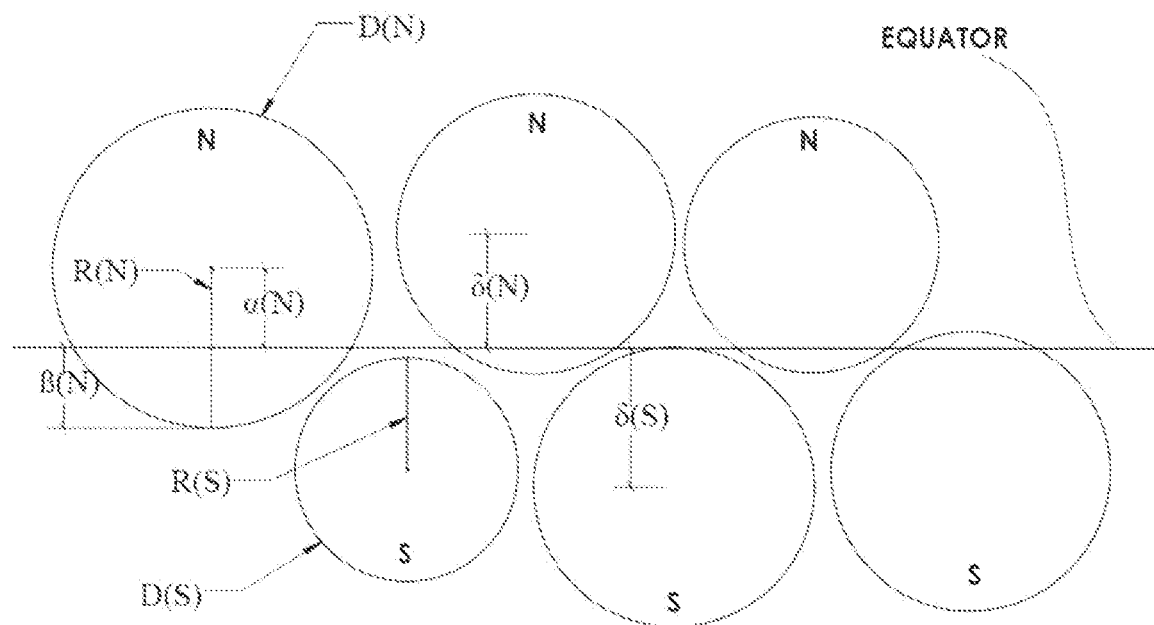
FIG. 17 is a schematic depicting golf balls north and south of an equator line, with the relationships of the dimple radius of the North and South dimples.
Figure 18:
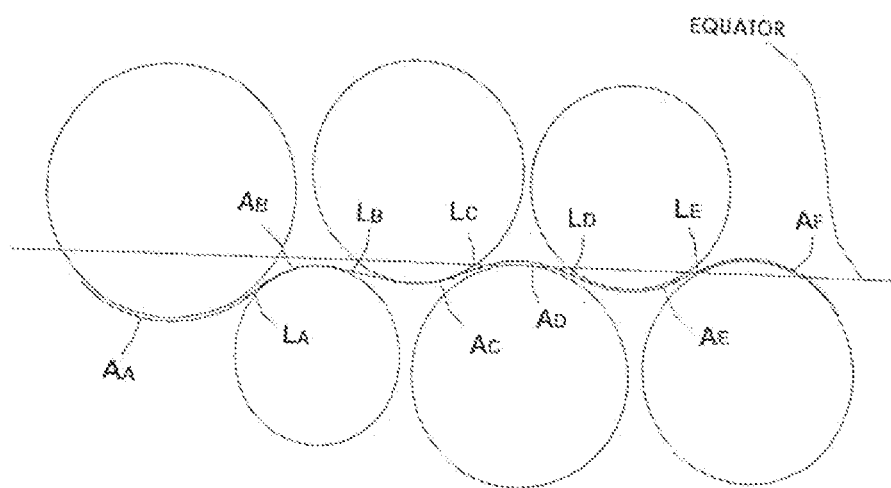
FIG. 18 is a schematic indicating a parting line and concentric arcs and their relationship to tangent lines thereof.

An embodiment is illustrated in FIGS. 17-20, which show a section of dimples from the Northern (N) and Southern (S) hemispheres of a golf ball in reference to the ball equator (FIG. 17). Utilizing the above methods, a staggered parting line may be fitted through the dimples to create a parting line comprised of arcs A and connecting line segments L, as shown in FIG. 18. Preferably, tangency is maintained between the arcs and line segments. In order to maintain tangency between the arcs and line segments, at least a portion of the arcs are designed to be very close to an adjacent dimple. For example, arc $A_B$ is designed to be very close to an adjacent dimple in order to maintain its tangency with connecting line segment $L_A$. Likewise, arc $A_C$ is very close to an adjacent dimple in order to maintain its tangency with connecting straight line segment $L_C$. If the parting line is too close to the dimples, for example, arcs $A_B$ and $A_C$ in FIG. 18, there is a greater risk of cutting into the dimple perimeter when creating the wave of a staggered cavity due to variability in the machining process, and cutting the dimple perimeters can have an adverse effect on the aerodynamic performance of the finished golf ball. This risk can be reduced by slowing down the cutting process of the wave, however this increases machining time and reduces cavity throughput. These manufacturing difficulties can be avoided by modifying the arcs such that they are no longer concentric with their associative dimples. Thus, in a particular embodiment of the present invention, at least a portion of the arcs are non-concentric arcs.

Figure 19:
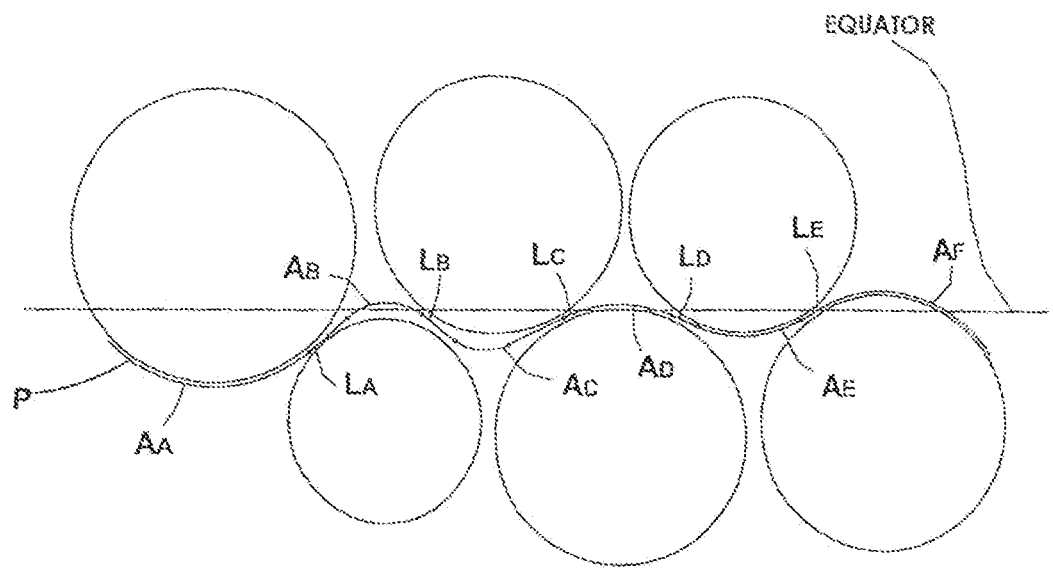
FIG. 19 is a schematic of an embodiment of the invention illustrating a parting line that includes non-concentric arcs.

As shown in FIG. 19, each of arc $A_B$ and arc $A_C$ is non-concentric with the dimple about which it is formed. Additionally, the radii of arcs $A_B$ and $A_C$ have been reduced to fit within a smaller area between the dimples. This allows for a greater distance between the dimple edge and the cavity parting line, while still maintaining tangency with the adjacent connecting lines. The increased distance from the dimple edge allows a manufacturer to maintain a higher feed rate during the machining process, thereby reducing cavity production time. This also reduces the possibility of cutting into the dimple perimeters during manufacturing. In this inventive aspect of the embodiment, the wave configuration slightly increases the amplitude of the wave, which allows for a more gradual tool inflection during the transition from cutting a peak to cutting a valley when using a 5-axis mill. This gradual transition produces a more repeatable process and minimizes part to part variation on the finished mold cavity. The result is a more consistent fit between mating cavity halves, thereby producing minimal flash on the molded golf ball.

In a particular embodiment, non-concentric arcs define the portions of the parting line that are formed about dimples satisfying one or more of the following conditions: dimples having a large size disparity in diameters with their adjacent neighbors from opposing hemispheres, and adjacent dimples from opposing hemispheres that are heavily weighted towards one hemisphere over the other.

For example, FIG. 17 shows dimples along a parting line having a large size disparity in diameters $D(N)$ and $D(S)$ with their adjacent neighbors from opposing hemispheres. A large disparity is considered to exist if the following condition is satisfied:

$$\frac{D(N)}{D(S)} > 1.25 \text{ or } \frac{D(N)}{D(S)} < 0.80$$

or more preferably if:

$$\frac{D(N)}{D(S)} > 1.40 \text{ or } \frac{D(N)}{D(S)} < 0.70$$

FIG. 17 also shows adjacent dimples from opposing hemispheres that are heavily weighted towards one hemisphere over the other. Relative weighting towards one hemisphere over the other is determined by the dimple radius preference coefficient which is calculated by the percentage of each dimple radius that lies within each hemisphere, $R(N)$ and $R(S)$. The percentage of $R(N)$ that lies within the Northern hemisphere is $\alpha(N)$, and the percentage in the Southern hemisphere is $\beta(N)$. Likewise, the percentage of $R(S)$ that lies within the Northern hemisphere is $\alpha(S)$ and the percentage in the Southern hemisphere is $\beta(S)$, and $\alpha$ and $\beta$ are always between zero and one, and $\alpha(N)+\beta(N)=1$, and $\alpha(S)+\beta(S)=1$. An important parameter is the distance from the center of a dimple to the equator. The distance from the center of a Northern dimple to the equator is $\delta(N)$ and the distance from the center of a Southern dimple to the equator is $\delta(S)$. The dimple radius preference coefficient ($C_{RP}$) is then defined as:

$$C_{RP} = \left(\frac{\delta(S)R(N)}{\delta(N)R(S)}\right)\left(\frac{\beta(N)R(N) + \beta(S)R(S)}{\alpha(N)R(N) + \alpha(S)R(S)}\right)$$

To be considered heavily weighted:

$C_{RP}$>1.5→which indicates it is weighted towards the North, or $C_{RP}$<0.66→which indicates it is weighted towards the South.

In a particular embodiment, $C_{RP}$>2.0→further indicating it is weighted towards the North, or $C_{RP}$<0.5→further indicating it is weighted towards the South.

Non-concentric arcs may also be utilized to define portions of the parting line when utilizing a concentric arc would provide inadequate relief from the dimple perimeter, i.e., when the wave relief is too small. The wave relief is measured as the distance from a dimple edge to an arc. For an arc that maintains its tangency with the connecting lines and is concentric with the adjacent dimple, if the wave relief distance is less than or equal to 0.002 inches, then a non-concentric arc may be beneficial.

Figure 20:
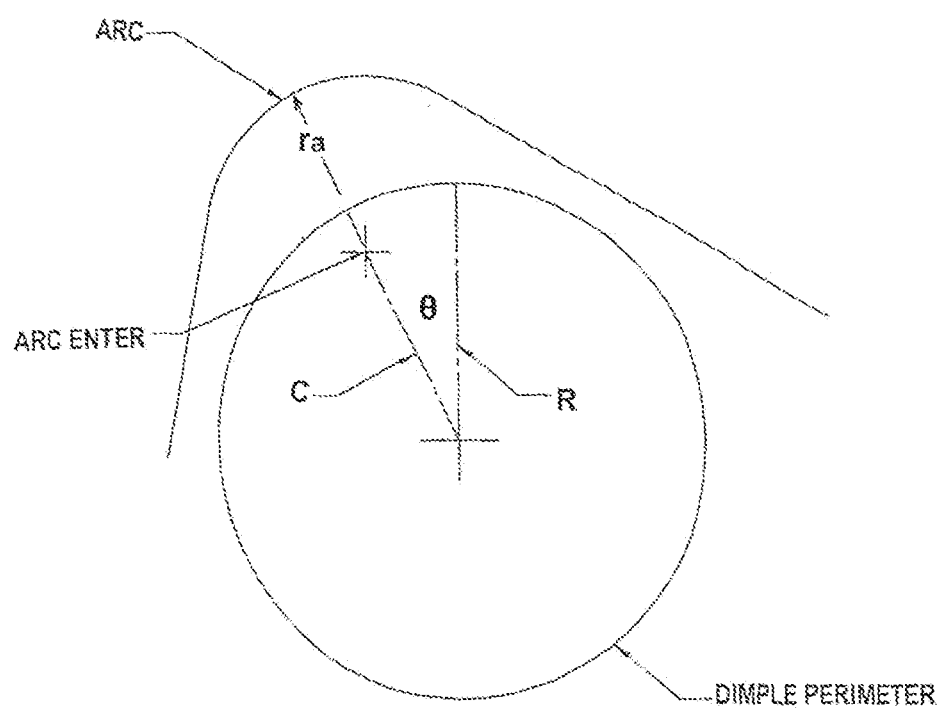
FIG. 20 is a schematic illustrating the method by which the non-concentric arcs are measured in relationship to the dimple center and dimple perimeter.

Once potential issues related to the wave design have been identified, non-concentric wave arcs are created about particular dimples, similar to those seen in FIG. 19 indicated by AB and AC, and in keeping with the arcs and wave relief as shown in FIG. 20. Any newly defined arc preferably maintains a tangency with its connecting lines and preferably has these additional properties:

1) The wave relief ($\Delta$) should be greater than 0.002 inches.

$$\Delta > 0.002$$

2) The radius of the newly defined non-concentric arc ($r_A$) should relate to its corresponding dimple perimeter diameter (D) such that:

$$r_A < \frac{D}{2} \text{ and } r_A > (0.10)\frac{D}{2}$$

3) Knowing that the newly defined arc is not concentric with the dimple perimeter, it need not lie exactly in the same longitudinal plane as the dimple center. It is to be considered herein that a longitudinal plane through the dimple center can differ from a plane comprising the center of the corresponding non-concentric arc Li and a vertical axis through the center of the ball. The angle between these planes is the arc shift angle (θ), defined in radians, and is related to the dimple diameter (D) such that:

$$\theta \le \frac{\pi D}{6}$$

Figure 21:
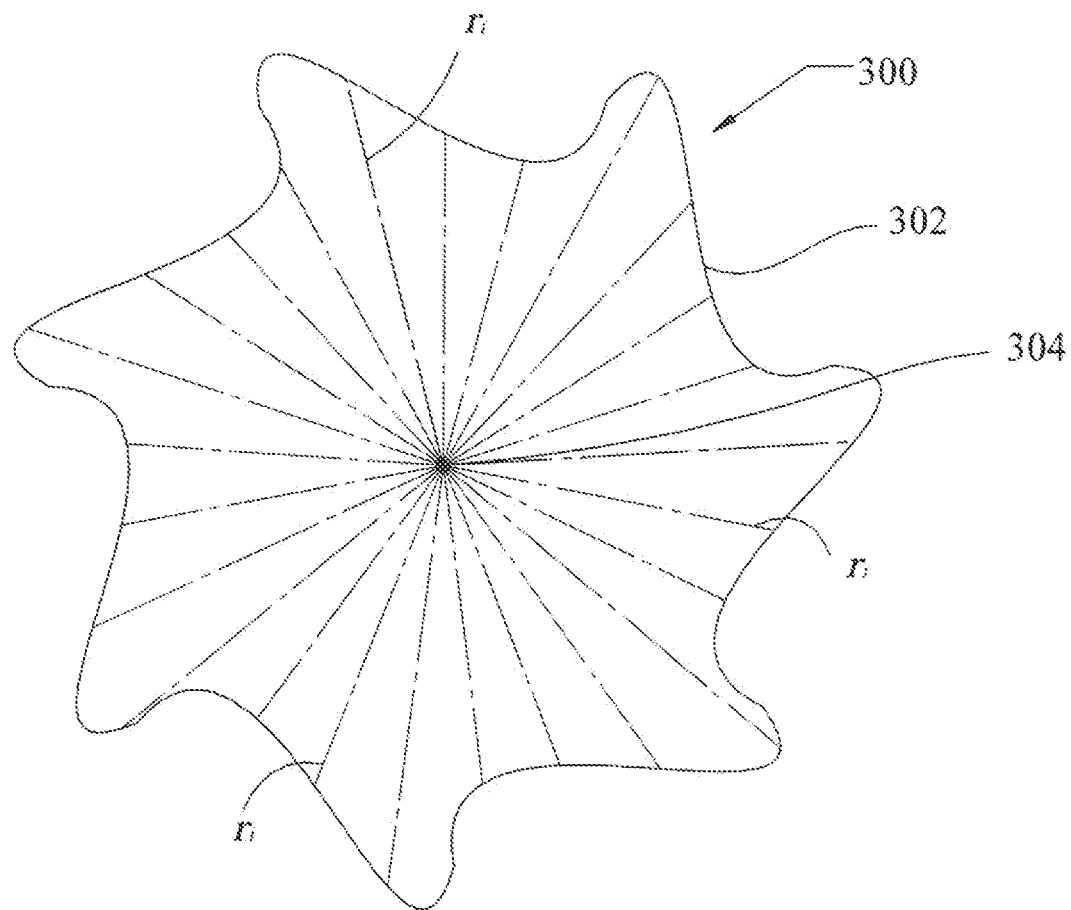
FIG. 21 is a plan view of a non-circular dimple according to an embodiment of the present invention.
Figure 22:
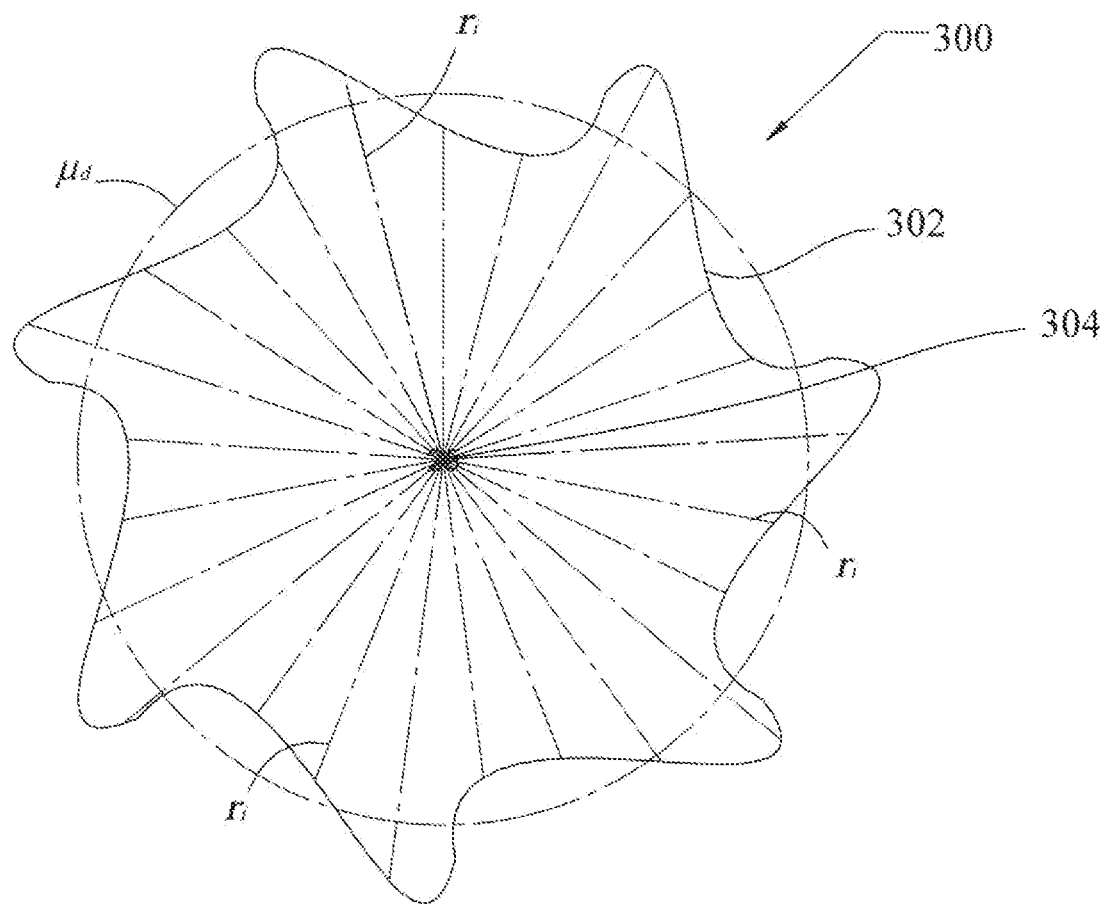
FIG. 22 is a plan view of the non-circular dimple of FIG. 21, showing the average dimple diameter for the non-circular dimple.
Figure 23:
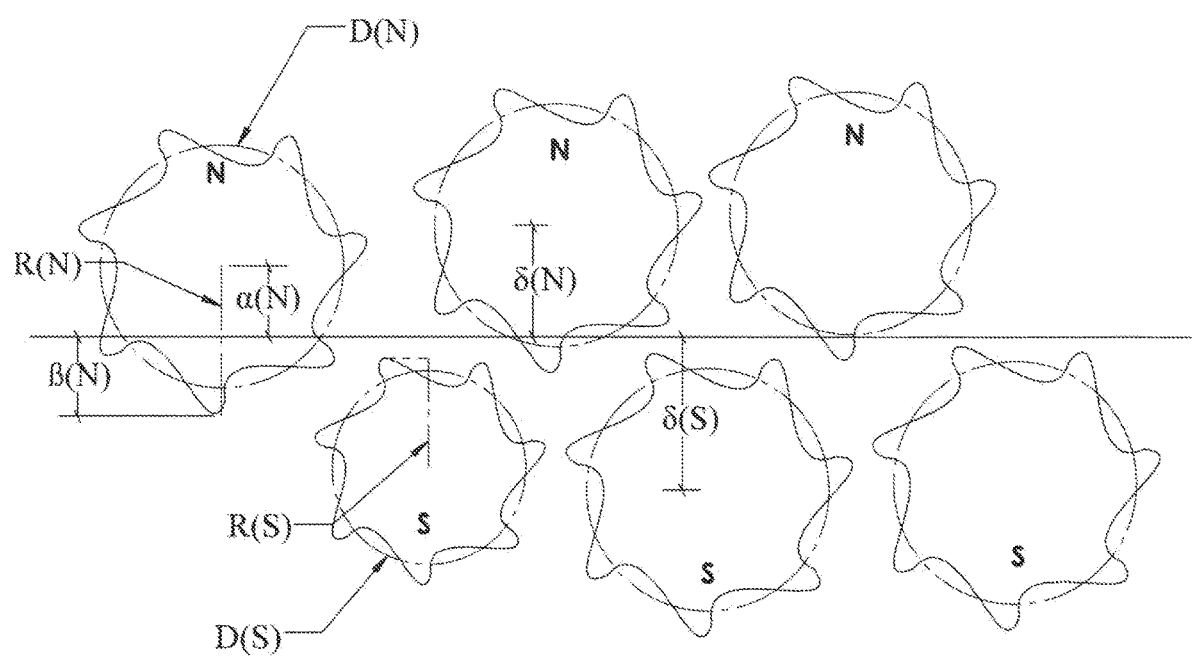
FIG. 23 is a schematic depicting golf balls north and south of an equator line, with the relationships of the dimple radius of the North and South dimples.
Figure 24:
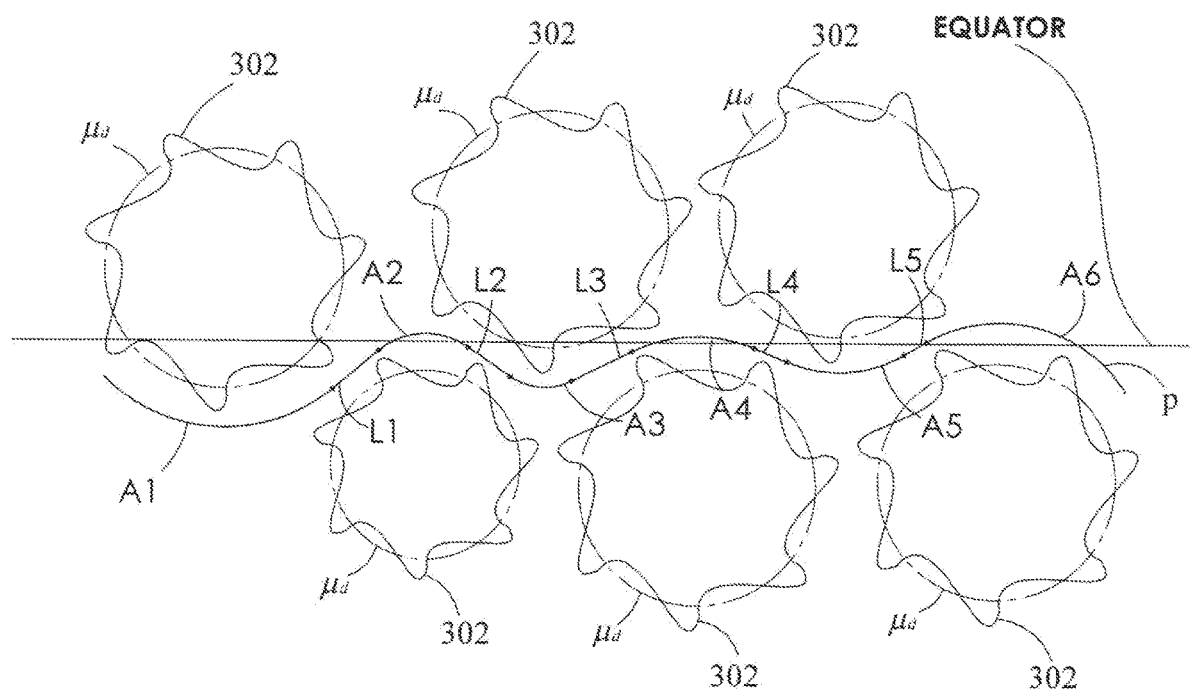
FIG. 24 is a schematic of an embodiment of the invention illustrating a parting line that includes non-concentric arcs and non-circular dimples.

Another embodiment is illustrated in FIGS. 21-26, which shows a section of non-circular dimples from the Northern (N) and Southern (S) hemispheres of a golf ball in reference to ball equator (FIG. 23). Utilizing the above methods, a staggered parting line may be fitted through the dimples to create a parting line comprised of arcs A and tangent lines L, as shown in FIG. 24.

As shown in FIG. 21, the non-circular dimples 300 according to the present embodiment have plan shapes that are non-circular. The dimple perimeters 302 are non-circular and may have an irregular shape. FIG. 21 shows an example of such a non-circular dimple 300, however, it will be understood that any such non-circular dimple plan shape maybe be used. It will also be appreciated that the golf ball may include both non-circular and circular dimples. Because the non-circular dimple 300 has an irregular perimeter 302, the average dimple diameter needs to be calculated. As shown in FIG. 21, the average non-circular dimple diameter is calculated determining the distance ($r_i$) from the dimple plan shape centroid 304 to a number of n points on the dimple perimeter 302. The average non-circular dimple diameter ($\mu_d$) shown in FIG. 22 is calculated using the following equation:

$$\mu_d = \sum_{i=0}^{n} \frac{2r_i}{n} \text{ and } n \ge 25$$

where $r_i$ is the distance from the dimple plan shape centroid 304 to a number of n points on the dimple perimeter 302.

It will be appreciated that both non-circular and circular dimples may be used on a golf ball. Moreover, both non-circular and circular dimples may be provided adjacent to the non-planar parting line.

FIG. 24, shows an example of dimple shapes incorporated into the non-planar parting lines P made up of arcs (A) and lines (L) as described above. In FIGS. 24, $A_2$ and $A_3$ are not concentric and their radii have been reduced to fit within a smaller area between the non-circular dimples. This allows for a greater distance between the non-circular dimple edge and the cavity parting line, while still maintaining tangency with the adjacent lines. The increased distance from the non-circular dimple edge allows a manufacturer to maintain a higher feed rate during the machining process, thereby reducing cavity production time. This also reduces the possibility of cutting into the dimple perimeters during manufacturing. In this inventive aspect of the embodiment, the wave configuration slightly increases the amplitude of the wave, which allows for a more gradual tool inflection during the transition from cutting a peak to cutting a valley when using a 5-axis mill. This gradual transition produces a more repeatable process and minimizes part to part variation on the finished mold cavity. The result is a more consistent fit between mating cavity halves, thereby producing minimal flash on the molded golf ball.

Non-circular dimples along a parting line may have a large size disparity in average non-circular dimple diameters $\mu_d$ (N) and $\mu_d$ (S) with their adjacent neighbors from opposing hemispheres, as illustrated in FIG. 23. A large disparity is considered to exist if the following condition is satisfied:

$$\frac{\mu_d(N)}{\mu_d(S)} > 1.25 \text{ or } \frac{\mu_d(N)}{\mu_d(S)} < 0.80$$

or more preferably if:

$$\frac{\mu_d(N)}{\mu_d(S)} > 1.40 \text{ or } \frac{\mu_d(N)}{\mu_d(S)} < 0.70$$

FIG. 23 shows adjacent non-circular dimples from opposing hemispheres that are heavily weighted towards one hemisphere over the other. Relative weighting towards one hemisphere over the other is determined by the non-circular dimple radius preference coefficient which is calculated by the percentage of each dimple radial distance lying within each hemisphere, R(N) and R(S). For non-circular dimples, the value of R is the distance from the dimple centroid to the point of the dimple perimeter nearest the opposite hemisphere. The percentage of R(N) that lies within the Northern hemisphere is α(N), and the percentage in the Southern hemisphere is β(N). Likewise, the percentage of R(S) that lies within the Northern hemisphere is α(S) and the percentage in the Southern hemisphere is β(S), and a and β are always between zero and one, and α(N)+β(N)=1, and α(S)+β(S)=1. An important parameter is the distance from the centroid 304 of a non-circular dimple to the equator. The distance from the centroid 304 of a Northern dimple to the equator is δ(N), and the distance from the center of a Southern dimple to the equator is δ(S). The non-circular dimple radius preference coefficient ($C_{RP}$) is then defined as:

$$C_{RP} = \left(\frac{\delta(S)R(N)}{\delta(N)R(S)}\right)\left(\frac{\beta(N)R(N) + \beta(S)R(S)}{\alpha(N)R(N) + \alpha(S)R(S)}\right)$$

To be considered heavily weighted:

$C_{RP}$>1.5→which indicates it is weighted towards the North, or $C_{RP}$<0.66→which indicates it is weighted towards the South.

More preferably:

$C_{RP}$>2.0→which indicates it is weighted towards the North, or $C_{RP}$<0.5→which means it is weighted towards the South.

Non-concentric arcs may also be utilized to define portions of a parting line that is formed about a non-circular dimple when utilizing a concentric arc would provide inadequate relief from the perimeter of the non-circular dimple, i.e., when the wave relief is too small. For an arc that maintains its tangency with the connecting lines and is concentric with the adjacent dimple, if the wave relief distance is less than or equal to 0.002 inches, then a non-concentric arc may be beneficial.

Figure 25:
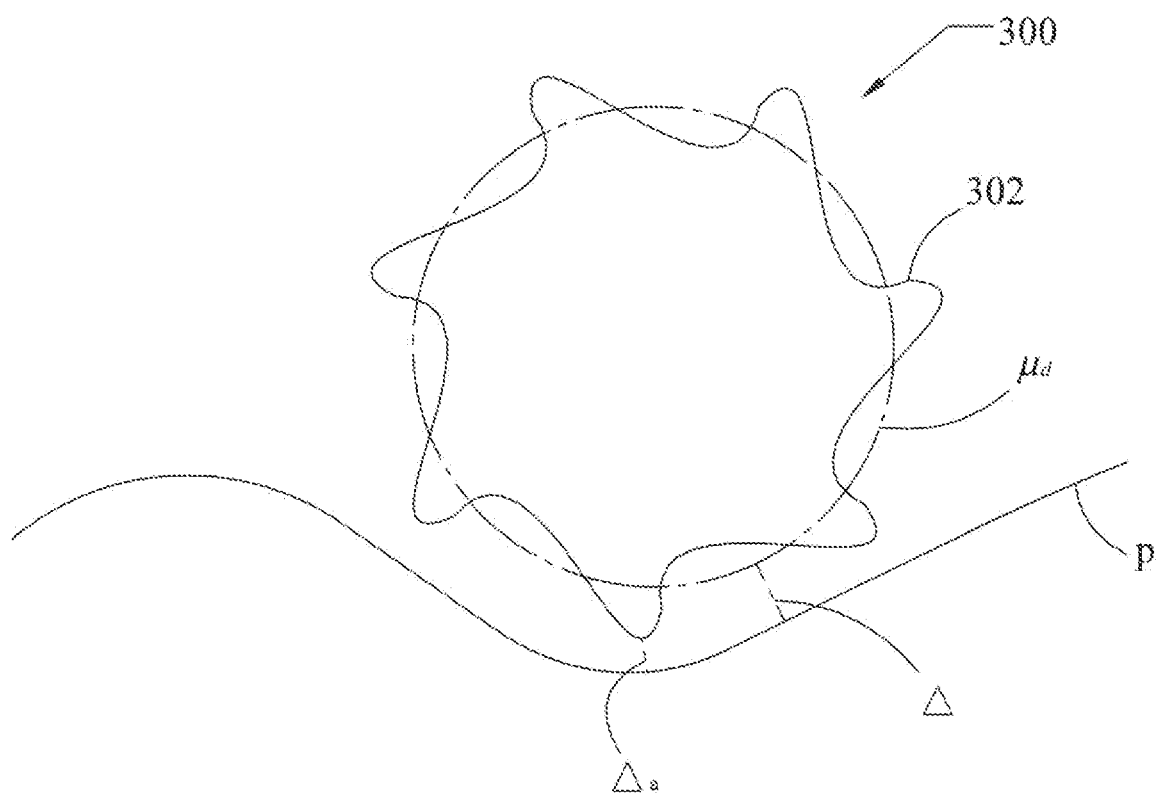
FIG. 25 is a schematic illustrating the relief distance and the absolute relief distance from the perimeter of the non-circular dimple.

Once the problem areas have been identified, non-concentric wave arcs are created about non-circular dimples, similar to those as seen in FIG. 24 indicated by $A_2$ and $A_3$, and in keeping with the arcs and wave relief as shown in FIG. 25. Any newly defined arc should maintain a tangency with its connecting lines and keep these properties:

1) The wave relief (Δ) should be greater than 0.003 inches, where the wave relief is the distance from the non-planar parting line to the average non-circular dimple perimeter.

$$\Delta > 0.003$$

2) The absolute wave relief distance ($\Delta_\alpha$) should be at least 0.001 inches for all points of the non-circular perimeter from any point of the non-planar parting line.

$$\Delta_a > 0.001$$

3) The radius of the newly defined non-concentric arc ($r_A$) should relate to its corresponding average non-circular dimple diameter ($\mu_d$) such that:

$$r_A < \frac{\mu_d}{2} \text{ and } r_A > (0.10)\frac{\mu_d}{2}$$

Figure 26:
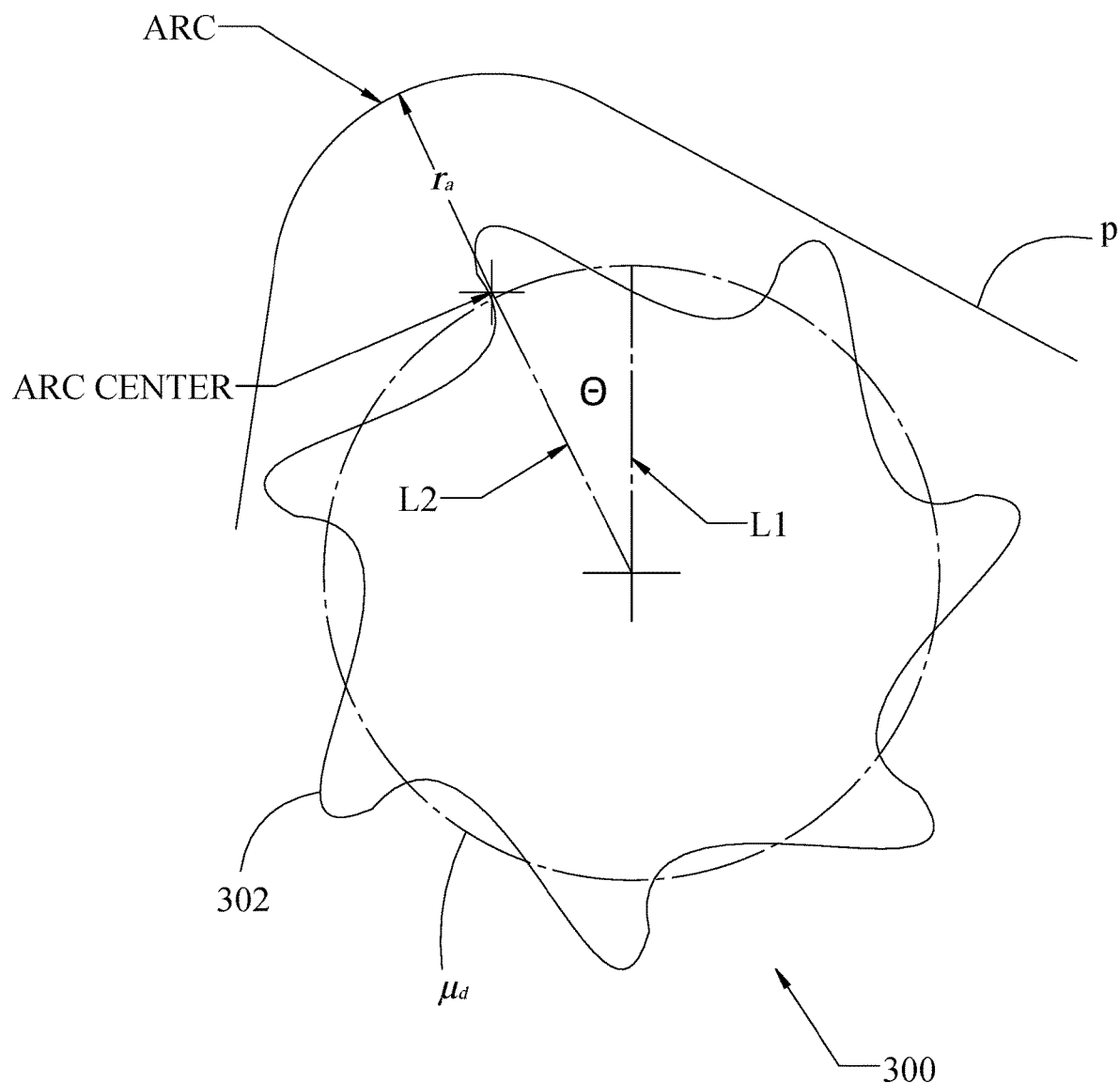
FIG. 26 is a schematic illustrating the method by which the non-concentric arcs are measured in relationship to the non-circular dimple center and non-circular dimple perimeter.

4) Knowing that the newly defined arc is not concentric with the dimple perimeter, it need not lie exactly in the same longitudinal plane as the non-circular dimple center. It is to be considered herein that a longitudinal plane through the non-circular dimple centroid can differ from a plane comprising the center of the corresponding non-concentric arc $L_2$ and a vertical axis through the center of the ball. As shown in FIG. 26, the angle between these planes is the arc shift angle (θ), defined in radians, and is related to the average non-circular dimple diameter ($\mu_d$) such that:

$$\theta \leq \frac{\pi \mu_d}{6}$$

Figure 27:
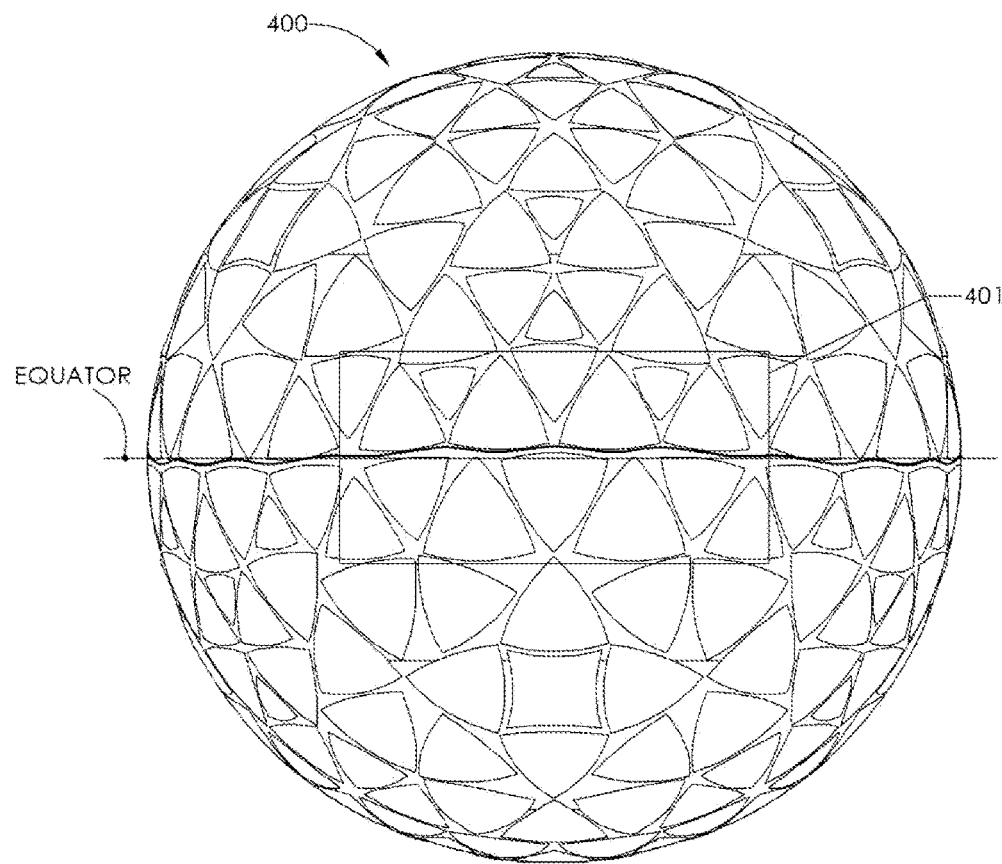
FIG. 27 illustrates a golf ball according to an embodiment the present invention.
Figure 28:
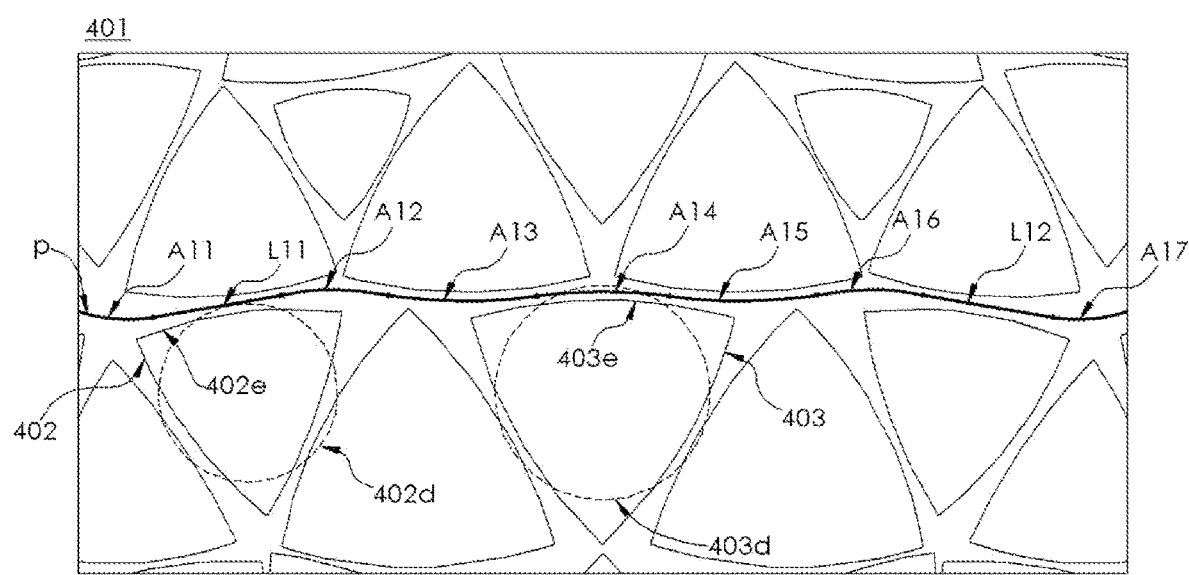
FIG. 28 is an enlarged detailed section of a final parting line configuration of the golf ball shown in FIG. 27.

FIGS. 27-28 illustrate a further aspect of the embodiment shown in FIGS. 21-26, wherein at least a portion of the non-circular dimples located adjacent to the non-planar parting line have average diameters that extend beyond the dimple perimeter nearest the parting line and may extend beyond the non-planar parting line. For purposes of the present invention, the average dimple diameter of a non-circular dimple is calculated as:

$$d_{ave} = \frac{d_{max} + d_{min}}{2}$$

where $d_{max}$ is the maximum distance from the dimple plan shape centroid to any point on the dimple perimeter and $d_{min}$ is the minimum distance from the dimple plan shape centroid to any point on the dimple perimeter. It should be understood that, while the term "average dimple diameter" of a non-circular dimple typically refers to the numerical value of the dimple's average dimple diameter, for purposes of the present invention and as would be understood by one of ordinary skill in the art, the "average dimple diameter" of a non-circular dimple may also refer to the boundary representing the circle that has the same center as the dimple and has a diameter that is equivalent to the numerical value of the average dimple diameter of the dimple.

Referring now to FIGS. 27-28, a golf ball 400 is shown having non-circular dimples, an equator located at an equal distance from both poles and dividing the golf ball into a top half and a bottom half, and a non-planar parting line fitted through the dimples along the path of the equator and consisting of arcs and straight line segments. Detailed view 401 of a portion of the parting line, p, shows arcs A11-A17 and straight line segments L11-L12. Each arc maintains a tangency at the point of connection with another arc or a straight line.

Dimple 402 has a dimple perimeter with an edge 402e near the parting line. None of the arcs, and particularly arc A12, are concentric with edge 402e. Dimple 402 has an absolute relief distance, measured as the shortest distance from parting line, p, to the dimple perimeter, of 0.004 inches. Dimple 402 has an average dimple diameter of 0.160 inches. A boundary 402d is shown which represents the circle that has the same center as dimple 402 and has a diameter equivalent to the average dimple diameter of dimple 402. Boundary 402d does not intersect the parting line, p. Dimple 402 has a wave relief, measured as the shortest distance from boundary 402d to the parting line, of 0.001 inches.

Dimple 403 has a dimple perimeter with an edge 403e near the parting line. Edge 403e is a circular arc and is concentric with arc A14. Dimple 403 has an absolute relief distance, measured as the shortest distance from parting line, p, to the dimple perimeter, of 0.003 inches. Dimple 403 has an average dimple diameter of 0.193 inches. A boundary 403d is shown which represents the circle that has the same center as dimple 403 and has a diameter equivalent to the average dimple diameter of dimple 403. Boundary 403d intersects the parting line, p.

Thus, in the embodiment illustrated in FIGS. 27-28, a golf ball is provided having a non-planar parting line and comprising a plurality of non-circular dimples located adjacent to the parting line. The following additional properties are also provided in the illustrated embodiment:

(a) the non-planar parting line consists of a plurality of arcs and a plurality of straight line segments;

(b) all of the dimples located adjacent to the parting line are non-circular dimples, as shown in FIG. 27; alternatively the dimples located adjacent to the parting line may include circular and non-circular dimples;

(c) all of the dimples on the surface of the golf ball are non-circular dimples, as shown in FIG. 27; alternatively, the dimples on the surface of the golf ball may include circular and non-circular dimples;

(d) each arc that is connected at an end to a straight line segment maintains a tangency with the straight line segment, and each arc that is connected at an end to another arc maintains a tangency with the arc;

(e) the plurality of non-circular dimples located adjacent to the parting line includes non-circular dimples having an average dimple diameter that intersects the parting line, such as dimple 403 in FIG. 28;

(f) each non-circular dimple located adjacent to the parting line has an absolute relief distance, measured as the shortest distance from the parting line to the perimeter of the dimple, of 0.005 inches or less; and (g) the plurality of non-circular dimples located adjacent to the parting line includes non-circular dimples having an average dimple diameter that does not intersect the parting line and that have a wave relief, measured as the shortest distance from the average dimple diameter of the dimple to the parting line, that is less than the absolute relief distance of the dimple, such as dimple 402 in FIG. 28.

In a further particular aspect of this embodiment, the plurality of arcs and straight line segments may include (1) arcs that connect to a straight line and another arc, such as arc A12 in FIG. 28, and/or (2) arcs that connect to two arcs, such as arc A13 in FIG. 28, and/or (3) arcs that connect to two straight lines.

In another further particular aspect of this embodiment, the sum of the lengths of the arcs relates to the sum of the straight line segments according to the equation:

$$(0.15)\sum L_{ARCS} \leq \sum L_{LINES} \leq (0.50)\sum L_{ARCS}.$$

In another further particular aspect of this embodiment, the plurality of straight line segments includes a minimum length straight line segment having a length ($L_{MIN}$), the plurality of non-circular dimples located adjacent to the parting line includes a minimum diameter non-circular dimple having a diameter ($D_{MIN}$), and $L_{MIN}$ is related to $D_{MIN}$ according to the equation:

$$L_{MIN} \geq (0.05) D_{MIN}$$

In another further particular aspect of this embodiment, adjacent non-circular dimples located on opposing sides of the parting line have a large size disparity such that either $$\frac{\mu_d(N)}{\mu_d(S)} > 1.25 \text{ or } \frac{\mu_d(N)}{\mu_d(S)} < 0.80$$

$$\frac{\mu_d(N)}{\mu_d(S)} > 1.40 \text{ or } \frac{\mu_d(N)}{\mu_d(S)} < 0.70$$

or, more preferably, either $$\frac{\mu_d(N)}{\mu_d(S)} > 1.40 \text{ or } \frac{\mu_d(N)}{\mu_d(S)} < 0.70$$

where $\mu_d$ (N) is the diameter of a non-circular dimple on one side of the parting line and $\mu_d$ (S) is the diameter of an adjacent non-circular dimple on the opposing side of the parting line.

In another further particular aspect of this embodiment, the golf ball has an equator located at an equal distance from both poles and dividing the golf ball into a top half and a bottom half, adjacent dimples located on opposing sides of the parting line are weighted more towards the top half or the bottom half such that each pair of adjacent dimples located on opposing sides of the parting line has a dimple radius preference coefficient, $C_{RP}$, of either greater than 1.5, or greater than 2.0, for pairs that are weighted more towards the top half or less than 0.66, or less than 0.50, for pairs that are weighted more towards the bottom half, $C_{RP}$ being defined by the equation:

$$C_{RP} = \left(\frac{\delta(S)R(N)}{\delta(N)R(S)}\right)\left(\frac{\beta(N)R(N) + \beta(S)R(S)}{\alpha(N)R(N) + \alpha(S)R(S)}\right)$$

each pair of adjacent dimples located on opposing sides of the parting line consists of a first dimple having a center that lies in the top half and a second dimple adjacent to the first dimple and having a center that lies in the bottom half, and where R(N) is the length of the radius of the first dimple;
α(N) is the percentage of R(N) that lies in the top half;
β(N) is the percentage of R(N) that lies in the bottom half;
δ(N) is the distance from the center of the first dimple to the closest point on the equator;
R(S) is the length of the radius of the second dimple;
α(S) is the percentage of R(S) that lies in the top half;
β(S) is the percentage of R(S) that lies in the bottom half; and
δ(S) is the distance from the center of the second dimple to the closest point on the equator.

In some embodiments of the present invention, it may be advantageous for a portion of the dimples located adjacent to the parting line to be positioned further from the parting line in order to accommodate certain tooling features, such as gates used for injection molding. Thus, in a particular aspect of any of the non-planar parting lines disclosed herein, including non-planar parting lines comprising a base waveform and at least one shorter secondary waveform, non-planar parting lines comprising arcs, and non-planar parting lines comprising arcs and straight line segments, the dimples located adjacent to the parting line include dimples having relatively small wave relief distances and dimples having relatively large wave relief distances. In a particular embodiment, the dimples located adjacent to the parting line consist of dimples having a wave relief distance of 0.001 inches or greater. In a particular aspect of this embodiment, the dimples located adjacent to the parting line consist of a first portion of dimples having a wave relief distance of from 0.001 inches to 0.005 inches, and a second portion of dimples having a wave relief distance of 0.008 inches or greater or having a wave relief distance of 0.010 inches or greater. In a further particular aspect of this embodiment, at least 40% of the dimples located adjacent to the parting line are dimples of the first portion and at least 40% of the dimples located adjacent to the parting line are dimples of the second portion, or at least 55% to 60% of the dimples located adjacent to the parting line are dimples of the first portion and from 40% to 45% of the dimples located adjacent to the parting line are dimples of the second portion, or the number of dimples of the first portion is equal to the number of dimples of the second portion. In another particular aspect of this embodiment, the plurality of dimples located adjacent to the parting line include at least one dimple having a minimum wave relief distance and at least one dimple having a maximum wave relief distance, and the difference between the minimum wave relief distance and the maximum wave relief distance is 0.004 inches or greater, or the difference between the minimum wave relief distance and the maximum wave relief distance is 0.006 inches or greater. The wave relief distance of a dimple is measured as the shortest distance from the average dimple diameter of the dimple to the parting line. For purposes of the present invention, the diameter of a dimple having a circular plan shape and the average dimple diameter of a dimple having a non-circular plan are referred to herein collectively as average dimple diameter and are determined according to the methods disclosed herein.

Figure 29:
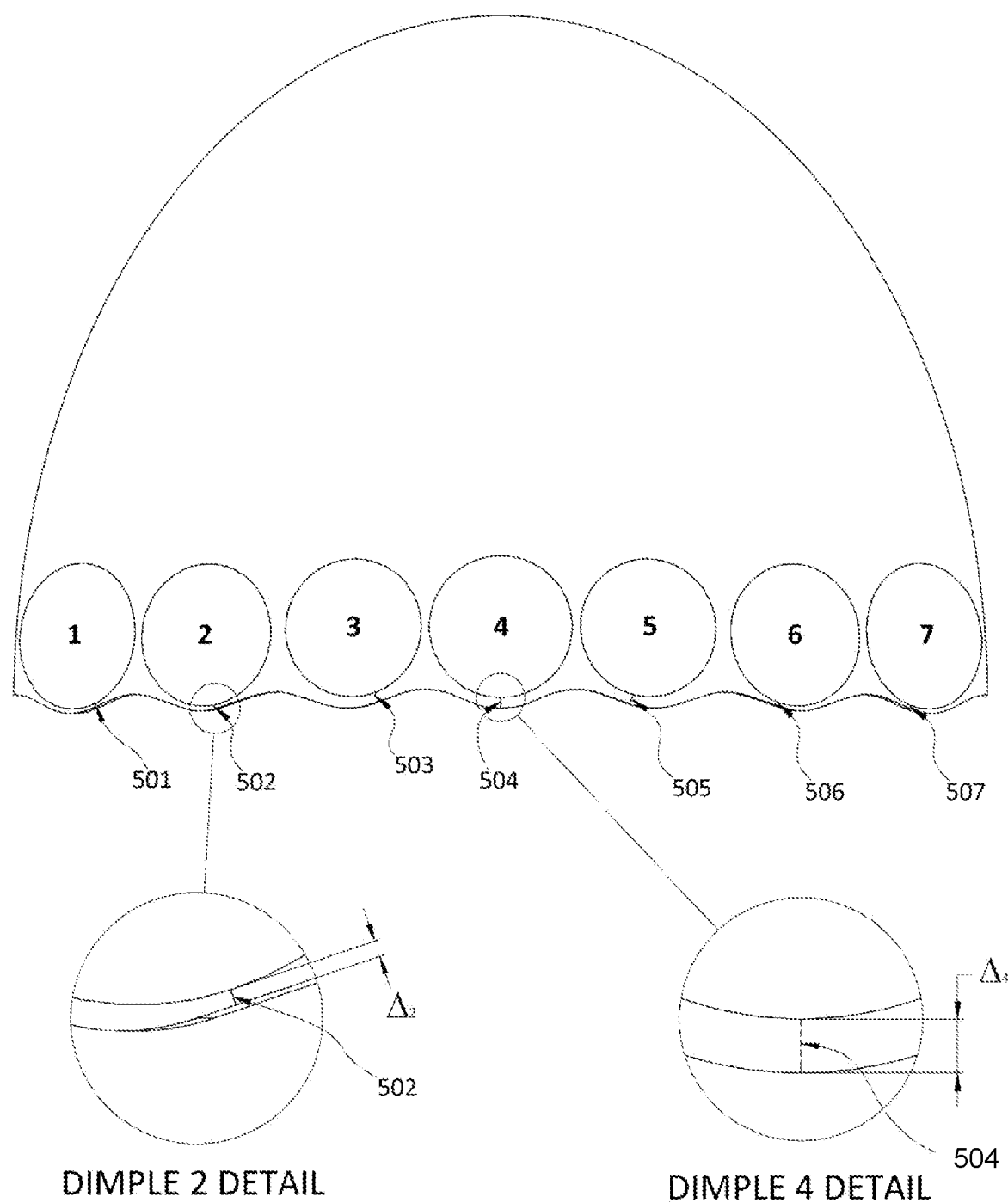
FIG. 29 illustrates dimples adjacent to a portion of a non-planar parting line according to an embodiment of the present invention and includes two enlarged sections of the embodiment.

For example, FIG. 29 illustrates an embodiment of the present invention wherein the dimples located adjacent to the parting line include dimples having relatively small wave relief distances and dimples having relatively large wave relief distances. In FIG. 29, a portion of a golf ball is shown having circular dimples adjacent to a non-planar parting line. Each of lines 501-507 represents the wave relief for each of dimples 1-7, i.e., the shortest distance from the average dimple diameter of each dimple to the parting line. An enlarged view of wave relief 502, measured as Δ2, and an enlarged view of wave relief 504, measured as Δ4, are also shown in FIG. 29. The non-planar parting line illustrated in FIG. 29 is defined by a base waveform:

$$\gamma_{base} = \frac{\pi D}{n}$$

where πD is the circumference of the ball and n is the number of repeated pattern segments and is equal to 4; and a secondary waveform:

$$\gamma_{secondary} = \frac{\gamma_{base}}{i}$$

where i is the number of dimples per segment and is equal to 7; and each dimple has a parting line wave relief distance according to Table 1 below.

TABLE 1

| Dimple Label | Wave Relief Label | Wave Relief Distance, $\Delta_i$ (inches) |
|---|---|---|
| 1 | 501 | 0.004 |
| 2 | 502 | 0.004 |
| 3 | 503 | 0.012 |
| 4 | 504 | 0.013 |
| 5 | 505 | 0.012 |
| 6 | 506 | 0.004 |
| 7 | 507 | 0.004 |

Thus, in the embodiment illustrated in FIG. 29, a non-planar parting line is provided comprising a plurality of dimples located adjacent to the parting line and consisting of a first portion of dimples having a wave relief distance of 0.004 inches, and a second portion of dimples having a wave relief distance of 0.012 inches or 0.013 inches, wave relief distance being measured as the shortest distance from the average dimple diameter of the dimple to the parting line.

In some embodiments of the present invention, it may be advantageous for at least a portion of the parting line to include intermediate arcs, instead of or in addition to tangent lines, connecting the main arcs of the parting line. Whether an arc defining a portion of the parting line is a main arc or an intermediate arc is readily ascertainable by one of ordinary skill in the art.

Figure 30:
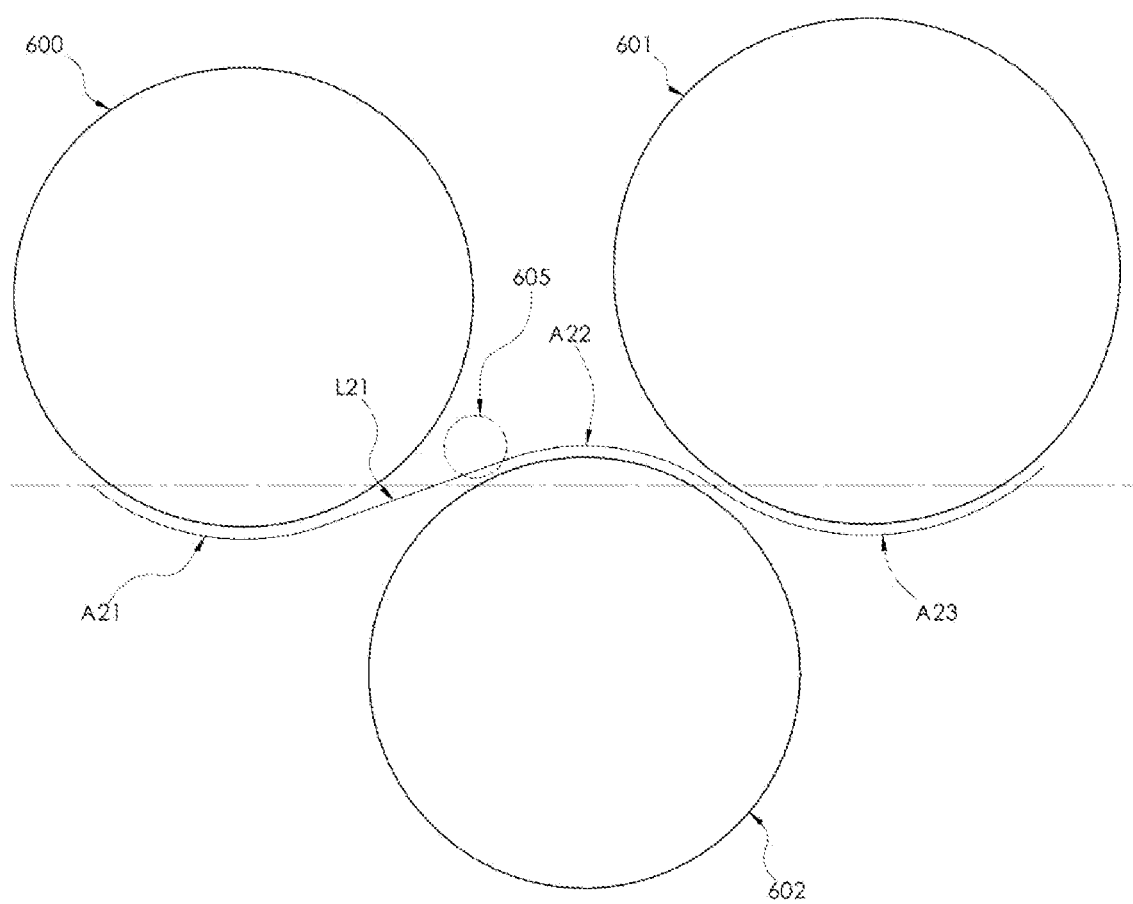
FIG. 30 illustrates dimples adjacent to a portion of a non-planar parting line according to an embodiment of the present invention.

For example, as demonstrated in FIGS. 30 and 31, it may be beneficial to use intermediate arcs to accommodate the placement of gates on the parting line. In FIGS. 30 and 31, the dotted line designates the equator and a potential location for a gate is designated as 605. FIG. 30 shows a portion of a parting line consisting of three arcs ($A_{21}$, $A_{22}$, and $A_{23}$), and a tangent connecting line $L_{21}$ connecting arcs $A_{21}$ and $A_{22}$. $A_{21}$ is concentric with adjacent dimple 600, $A_{22}$ is concentric with adjacent dimple 602, and $A_{23}$ is concentric with adjacent dimple 601. For purposes of manufacturing the parting line on the mold cavity, the potential gate location 605 is not compatible with the portion of the parting line shown in FIG. 30.

FIG. 31 shows a portion of a parting line consisting of three main arcs ($A_{21}$, $A_{22}$, and $A_{23}$) and two intermediate arcs $IA_{21}$ and $IA_{22}$ connecting arcs $A_{21}$ and $A_{22}$. Intermediate arc $IA_{21}$ maintains a tangency with $A_{21}$, intermediate arc $IA_{22}$ maintains a tangency with $A_{22}$, and $IA_{21}$ and $IA_{22}$ are tangent with one another.

In FIG. 31, the dimples (600, 601, and 602), the three main arcs ($A_{21}$, $A_{22}$, and $A_{23}$), and the potential gate location 605 correspond in size, shape, and position to those in FIG. 30. Thus, $A_{21}$ is concentric with adjacent dimple 600, $A_{22}$ is concentric with adjacent dimple 602, and $A_{23}$ is concentric with adjacent dimple 601. However, in FIG. 31, a portion of the parting line has been modified such that arcs $A_{21}$ and $A_{22}$ are connected with intermediate arcs rather than a straight line segment as in FIG. 30, thus providing a compatible wave design and gate configuration for manufacturing the parting line on the mold cavity.

In a particular aspect of the embodiment shown in FIGS. 30 and 31, dimples 600, 601, and 602 have diameters of 0.165 inches, 0.182 inches, and 0.155 inches, respectively; main arcs $A_{21}$, $A_{22}$, and $A_{23}$ have radii of 0.085 inches, 0.082 inches, and 0.095 inches, respectively; and intermediate arcs $IA_{21}$ and $IA_{22}$ have radii of 0.043 inches and 0.047 inches, respectively.

Thus, in a particular aspect of any of the non-planar parting lines disclosed herein, including non-planar parting lines comprising a plurality of concentric arcs, non-planar parting lines comprising a plurality of concentric and non-concentric arcs, and non-planar parting lines comprising arcs and straight line segments, at least a portion of the parting line includes a first main arc adjacent to a first dimple, a second main arc adjacent to a second dimple located on the opposing side of the parting line from the first dimple, and at least one intermediate arc connecting the first concentric arc and the second concentric arc. Each main arc is selected from concentric arcs and non-concentric arcs, as further described herein.

It is appreciated that numerous modifications and other embodiments may be devised by those skilled in the art. Therefore, it will be understood that the appended claims are intended to cover all modifications and embodiments, which would come within the spirit and scope of the present invention.

The dimple patterns of the present invention can be used with any type of golf ball with any playing characteristics. For example, the dimple pattern can be used with conventional golf balls, solid or wound. These balls typically have at least one core layer and at least one cover layer. Wound balls typically have a spherical solid rubber or liquid filled center with a tensioned elastomeric thread wound thereon. Wound balls typically travel a shorter distance, however, when struck as compared to a two-piece ball. The cores of solid balls are generally formed of a polybutadiene composition. In addition to one-piece cores, solid cores can also contain a number of layers, such as in a dual core golf ball. Covers, for solid or wound balls, are generally formed of ionomer resins, balata, or polyurethane, and can consist of a single layer or include a plurality of layers and, optionally, at least one intermediate layer disposed about the core.

All of the patents and patent applications mentioned herein by number are incorporated by reference in their entireties.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. For example, while a non-circular dimple has been provided, it is understood that the non-circular dimple may have any desired non-circular shape with any desired irregular perimeter. Thus the present invention should not be limited by the above-described exemplary embodiments, but should be defined only in accordance with the following claims and their equivalents.

What is claimed is:

1. A golf ball having a non-planar parting line and comprising a plurality of dimples located adjacent to the parting line, wherein:

the parting line comprises a plurality of main arcs, each main arc being selected from concentric arcs and non-concentric arcs, for each concentric arc, the radius, $r_{ARC}$, of the arc relates to an adjacent dimple having a diameter, $D_{DIMPLE}$, such that $$(1.005)\frac{D_{DIMPLE}}{2} \leq r_{ARC} \leq (1.06)\frac{D_{DIMPLE}}{2},$$

and for each non-concentric arc, the radius, $r_{ARC}$, of the arc relates to an adjacent dimple having a diameter, $D_{DIMPLE}$, such that $$(0.10)\frac{D_{DIMPLE}}{2} < r_{ARC} < \frac{D_{DIMPLE}}{2};$$

and the plurality of dimples located adjacent to the parting line consists of a first portion of dimples and a second portion of dimples, each dimple of the first portion having a wave relief distance of from 0.001 inches and 0.005 inches, and each dimple of the second portion having a wave relief distance of 0.008 inches or greater, where wave relief distance is measured as the shortest distance from the average dimple diameter of the dimple to the parting line.

2. The golf ball of claim 1, wherein each main arc is connected at each of its two ends to an adjacent main arc with a connector selected from a straight line segment, an intermediate arc, and combinations of two or more thereof, and each arc on the parting line that is connected at an end to a straight line segment maintains a tangency with the straight line segment and each arc on the parting line that is connected at an end to another arc maintains a tangency with the arc.

3. The golf ball of claim 1, wherein the wave relief distance of each dimple of the second portion is 0.010 inches or greater.

4. The golf ball of claim 1, wherein the difference between the minimum wave relief distance and the maximum wave relief distance among the wave relief distance values of the plurality of dimples located adjacent to the parting line is 0.004 inches or greater.

5. The golf ball of claim 1, wherein the difference between the minimum wave relief distance and the maximum wave relief distance among the wave relief distance values of the plurality of dimples located adjacent to the parting line is 0.006 inches or greater.

6. The golf ball of claim 1, wherein at least 40% of the plurality of dimples located adjacent to the parting line are dimples of the first portion and at least 40% of the plurality of dimples located adjacent to the parting line are dimples of the second portion.

7. The golf ball of claim 6, wherein 55% to 60% of the plurality of dimples located adjacent to the parting line are dimples of the first portion.

8. The golf ball of claim 6, wherein the number of dimples of the first portion is equal to the number of dimples of the second portion.

* * * * *